United States Patent
Kim

(10) Patent No.: US 9,946,456 B2
(45) Date of Patent: Apr. 17, 2018

(54) MOBILE TERMINAL AND METHOD OF CONTROLLING THE SAME

(71) Applicant: LG ELECTRONICS INC., Seoul (KR)

(72) Inventor: Meeyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/746,630

(22) Filed: Jun. 22, 2015

(65) Prior Publication Data

US 2016/0124468 A1     May 5, 2016

(30) Foreign Application Priority Data

Oct. 31, 2014  (KR) .......................... 10-2014-0150498

(51) Int. Cl.
*G06F 1/16* (2006.01)
*G06F 3/0488* (2013.01)

(52) U.S. Cl.
CPC .......... *G06F 3/04883* (2013.01); *G06F 1/169* (2013.01); *G06F 1/1626* (2013.01); *G06F 1/1643* (2013.01); *G06F 2203/04104* (2013.01)

(58) Field of Classification Search
None
See application file for complete search history.

(56) References Cited

U.S. PATENT DOCUMENTS

| 6,415,165 B1 | 7/2002 | Ishigami |
| 6,944,472 B1 | 9/2005 | Ishigami |
| 8,130,207 B2 | 3/2012 | Nurmi et al. |
| 8,352,884 B2 | 1/2013 | Zalewski et al. |
| 8,497,884 B2 | 7/2013 | Cholewin et al. |
| 8,593,401 B1 | 11/2013 | Kim et al. |

(Continued)

FOREIGN PATENT DOCUMENTS

| EP | 2214091 | 8/2010 |
| EP | 2254032 | 11/2010 |

(Continued)

OTHER PUBLICATIONS

Korean Intellectual Property Office Application Serial No. 10-2014-0150498, Office Action dated Feb. 18, 2016, 4 pages.

(Continued)

*Primary Examiner* — Alexander Eisen
*Assistant Examiner* — Kebede Teshome
(74) *Attorney, Agent, or Firm* — Lee, Hong, Degerman, Kang & Waimey PC

(57) ABSTRACT

A mobile terminal having a terminal body including a first side and a second side, a display located on the first side and configured to display information, a first touch sensor configured to receive touch inputs and located on the first side, a second touch sensor configured to receive touch inputs and located on the second side, and a controller configured to cause the display to display a first screen information, and a secondary image with the first screen information when a first touch input is received via the first touch sensor and a corresponding second touch input is received via the second touch sensor, wherein the secondary image is related to a selected region of the first screen information corresponding to a position of the first touch input.

23 Claims, 32 Drawing Sheets

(56) References Cited

U.S. PATENT DOCUMENTS

| | | |
|---|---|---|
| 8,775,966 B2 | 7/2014 | Stolyarov et al. |
| 2001/0041598 A1 | 11/2001 | Yoshino et al. |
| 2007/0291008 A1 | 12/2007 | Wigdor et al. |
| 2009/0237372 A1* | 9/2009 | Kim .................. G06F 3/044 345/173 |
| 2009/0256809 A1 | 10/2009 | Minor |
| 2009/0315834 A1* | 12/2009 | Nurmi ................ G06F 3/041 345/173 |
| 2010/0120470 A1* | 5/2010 | Kim ................... G06F 1/1615 455/566 |
| 2010/0164904 A1 | 7/2010 | Kim et al. |
| 2010/0188353 A1 | 7/2010 | Yoon et al. |
| 2010/0194705 A1 | 8/2010 | Kim et al. |
| 2010/0277420 A1 | 11/2010 | Charlier et al. |
| 2011/0163986 A1* | 7/2011 | Lee .................... G06F 1/1692 345/173 |
| 2012/0274588 A1* | 11/2012 | Bamba ............... G06F 1/3218 345/173 |
| 2013/0100036 A1 | 4/2013 | Papakipos et al. |
| 2014/0062919 A1 | 3/2014 | Park |
| 2014/0160010 A1 | 6/2014 | Jung et al. |
| 2014/0181737 A1 | 6/2014 | Hwang et al. |
| 2015/0163410 A1* | 6/2015 | Yamazaki ........ H04N 5/23293 348/333.11 |

FOREIGN PATENT DOCUMENTS

| | | |
|---|---|---|
| EP | 2341414 | 7/2011 |
| EP | 2341418 | 7/2011 |
| EP | 2637086 | 9/2013 |
| EP | 2683140 | 1/2014 |
| EP | 2793119 | 10/2014 |
| JP | 2014-29673 | 2/2014 |
| KR | 10-2010-0086639 | 8/2010 |
| KR | 10-0983902 | 9/2010 |
| KR | 10-2011-0026960 | 3/2011 |
| KR | 10-1021857 | 3/2011 |
| KR | 10-2011-0081040 | 7/2011 |
| KR | 10-1227949 | 1/2013 |
| KR | 10-2014-0029729 | 3/2014 |
| KR | 10-2014-0080220 | 6/2014 |
| WO | 2011077448 | 6/2011 |

OTHER PUBLICATIONS

European Patent Office Application No. 15173064.5, Search Report dated May 10, 2016, 12 pages.

* cited by examiner

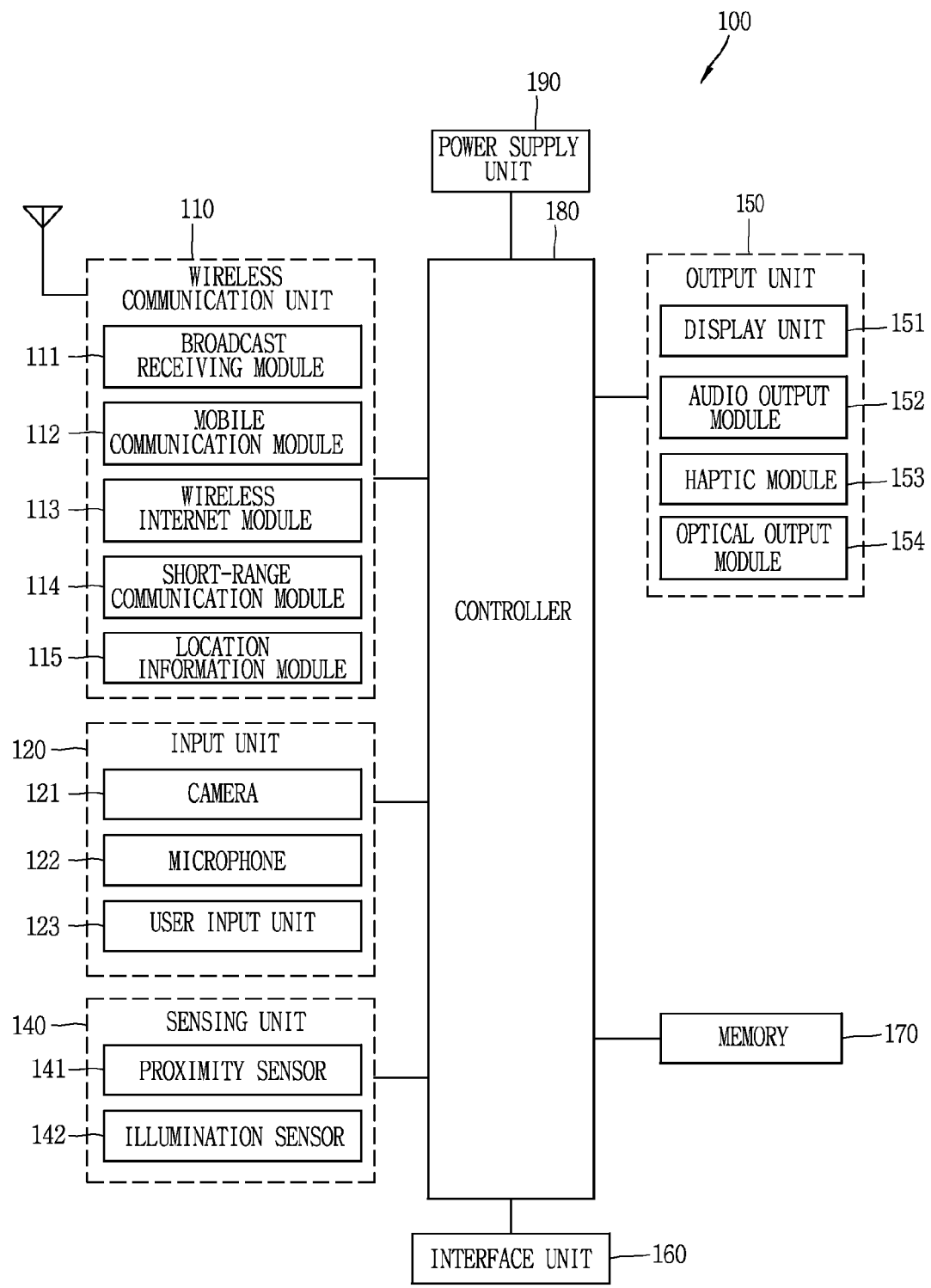

410

410a

410b

MOBILE TERMINAL AND METHOD OF CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2014-0150498, filed on Oct. 31, 2014, the contents of which is incorporated by reference herein in its entirety.

BACKGROUND OF THE INVENTION

1. Field of the Invention

This specification relates to a mobile terminal, and more particularly, to a mobile terminal capable of receiving a two-surface touch input.

2. Background of the Invention

A terminal may be broadly categorized as a mobile terminal or a stationary terminal based on mobility. The mobile terminal may be further categorized based on portability as a handheld terminal or a vehicle-mounted terminal.

In response to an increasing demand for diversified functions, the terminal has been realized in the form of a multimedia player with multiple functions such as shooting a photographic object as a still image or moving images, reproducing digital audio and video compression files, playing a game, receiving a broadcast, and the like. Furthermore, structural and software modifications to the mobile terminal are considered for supporting and improving functions of the mobile terminal.

As visual information provided to a user through a display unit becomes diversified, a user may control the visual information by applying a touch input to the display unit. However, there is a disadvantage in that the user is required to obtain or control his or her desired visual information by repeatedly applying different types of touch inputs multiple times to utilize the visual information.

SUMMARY OF THE INVENTION

Therefore, an aspect of the detailed description is to provide a mobile terminal capable of controlling visual information in a simpler manner by using a two-surface touch sensor.

To achieve these and other advantages and in accordance with the purpose of this specification, as embodied and broadly described herein, there is provided a mobile terminal, including: a terminal body comprising a first side and a second side; a display disposed on the first side and configured to display information; a first touch sensor configured to receive touch inputs and disposed on the first side; a second touch sensor configured to receive touch inputs and disposed on the second side; and a controller configured to cause the display to display: a first screen information; and a secondary image with the first screen information, the secondary image related to a selected region of the first screen information; wherein the selected region comprises an area on the display corresponding to an overlap of a first touch input received via the first touch sensor and a second touch input received via the second touch sensor when positions of the first touch input and the second touch input are virtually extended toward each other.

In an embodiment, the controller is further configured to cause the display to continue displaying the first screen information while touch inputs are sensed by the first and second touch sensors.

In an embodiment, the display unit may display second screen information in response to an additional control command. Further, the display unit may restore the screen information when the first and second touch inputs are released. Thus, a user may be provided with new information, and then may be provided with the initial screen information.

In an embodiment, the display unit may display a plurality of function regions each corresponding to a function associated with the selected region in order to execute functions associated with the selected region. Thus, a user may control functions associated with the selected region.

In the present invention, while screen information is output, the screen information may be controlled by distinguishing a single-surface touch input from a two-surface touch input. Further, an image related to part of the screen information may be output based on a two-surface touch input, without changing the screen information. Thus, a user may select only part of the screen information and may utilize information included in the image or perform an additional function, based on an additional touch input applied to the output image.

Accordingly, a user may utilize various contents included in screen information, based on various types of touch inputs.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 1A is a block diagram of a mobile terminal in accordance with the present disclosure;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC, an ultra book, a wearable device (e.g., smart watch), a glass-type terminal (e.g., smart glass), a head mounted display (HMD), etc.

However, it will be obvious to those skilled in the art that the present invention may be also applicable to a fixed terminal such as a digital TV, a desktop computer and a digital signage, except for specific configurations for mobility.

Figure 1B:
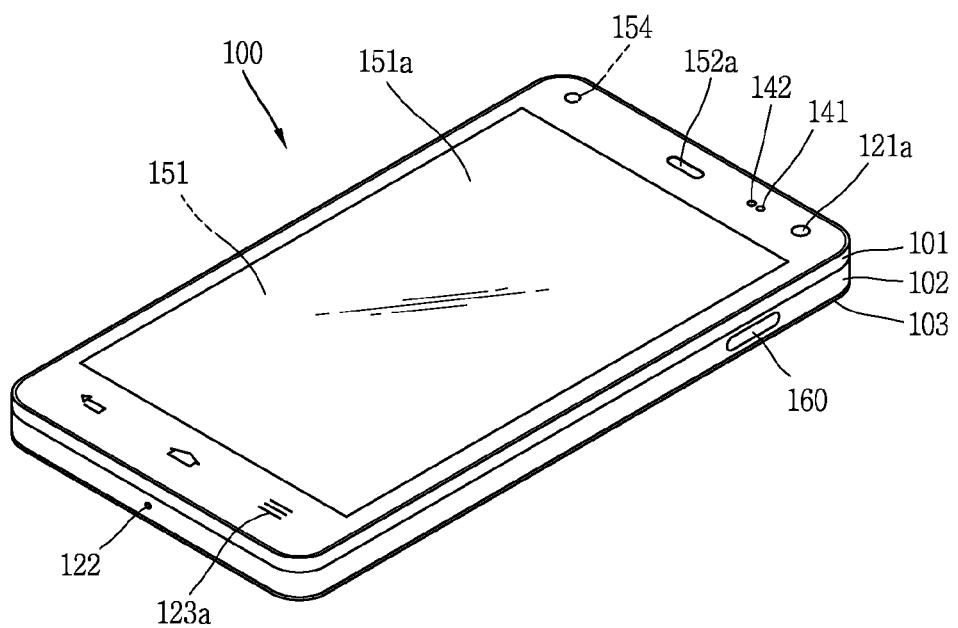
FIGS. 1B and 1C are conceptual views illustrating an example of a mobile terminal according to the present invention, as viewed from different viewpoints.
Figure 1C:
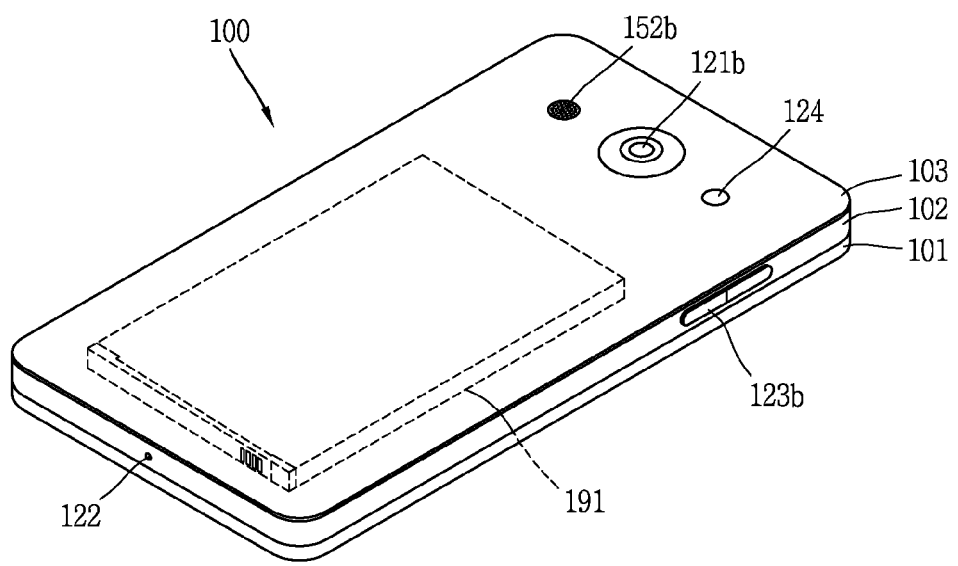

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components of FIG. 1A is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), Long Term Evolution (LTE), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency Identification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The user input unit 123 may recognize information sensed by the sensing unit 140, as well as by the aforementioned mechanical input means and touch type input means, as information input from a user. Accordingly, the controller 180 can control an operation of the mobile terminal 100 corresponding to the sensed information.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region on the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 2A:
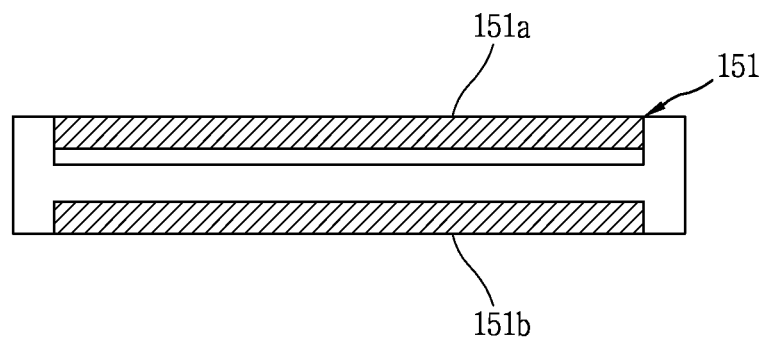
FIG. 2A is a conceptual view illustrating a touch sensing unit composed of a first touch sensor and a second touch sensor.

FIG. 2A is a conceptual view illustrating a touch sensing unit composed of a first touch sensor 151a and a second touch sensor 151b.

Referring to FIG. 2A, the mobile terminal 100 is provided with a front surface and a rear surface, and the display unit 151 may be formed to face the front surface. The first touch sensor 151a may be formed in an integral or overlapped manner with the display unit 151. The second touch sensor 151b may be formed on the rear surface of the mobile terminal. That is, the first and second touch sensors 151a, 151b may be formed on opposite surfaces of the mobile terminal 100.

The first touch sensor 151a and the second touch sensor 151b may be electrically coupled to each other, such that a sensed touch input is received by the controller 180. However, the present invention is not limited to this. The first and second touch sensors 151a, 151b may be formed independently, and independent controllers, which form a control signal in response to a touch input sensed by the first or second touch sensors 151a, 151b, may be implemented.

Figure 2B:
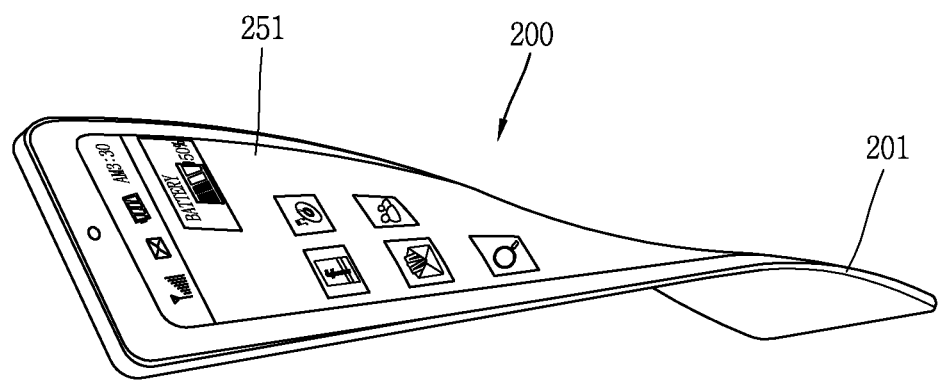
FIG. 2B is a conceptual view illustrating another example of a mobile terminal according to an embodiment of the present disclosure.

FIG. 2B is a conceptual view illustrating another example of a mobile terminal 200 according to an embodiment of the present invention.

As shown, a display unit 251 is configured to be deformable by an external force. This deformation may include any of curving, bending, folding, twisting, rolling, and the like, or combinations thereof. The deformable display unit 251 may also be referred to as a 'flexible display unit' or 'bendable display unit'. In some implementations, the flexible display unit 251 may include a general flexible display, electronic paper (also known as e-paper), and the like, or combinations thereof. Generally, the mobile terminal 200 may include the features of the mobile terminal 100 discussed with respect to FIGS. 1A to 1C, or similar features.

The flexible display unit of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature—referred to as a first state), a display region of the flexible display unit 251 includes a generally flat surface. When in a state that the flexible display unit 251 is deformed from the first state by an external force (for example, a state with a finite radius of curvature—referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternate embodiment, the first state of the flexible display unit 251 may be a curved state (for example, a state of being curved from top to bottom or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 may execute certain control corresponding to the touch input. In general, the flexible touch screen is configured to sense touch and other inputs while in the first or second states.

In an embodiment, the mobile terminal 200 may be configured to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may include information of a deformed direction, a deformed degree, a deformed position, a deformed amount of time, an acceleration rate in which the deformed flexible display unit 251 is restored, and the like. Other possibilities include most any type of information which can be sensed in response to the curving of the flexible display unit or sensed while the flexible display unit 251 is transitioning into, or existing in, the first or second states.

In some embodiments, controller 180 or another component of the mobile terminal may change information displayed on the flexible display unit 251, or generate a control signal for controlling a function of the mobile terminal 200 based on the information related to the deforming of the flexible display unit 251. Such information may be sensed by the deformation sensor.

Referring back to FIG. 2B, The mobile terminal 200 is shown as having a case 201 for accommodating the flexible display unit 251. The case 201 can be deformable together with the flexible display unit 251, taking into account the characteristics of the flexible display unit 251. It will be understood that reference to a display unit may include various embodiments of the display unit as discussed above, including but not limited to, display unit 151 and display unit 251.

A battery (not shown in this figure) located in the mobile terminal 200 may also be deformable in cooperation with the flexible display unit 261, taking into account the characteristic of the flexible display unit 251. One embodiment may implement a technique using a stack and folding method of stacking battery cells.

The deformation of the flexible display unit 251 is not limited to resulting from an external force. For example, the flexible display unit 251 of various embodiments may be deformed into the second state from the first state by a user command, application command, or the like.

Hereinafter, embodiments of a control method with respect to such a mobile terminal will be explained in more detail with reference to the attached drawings.

Figure 3A:
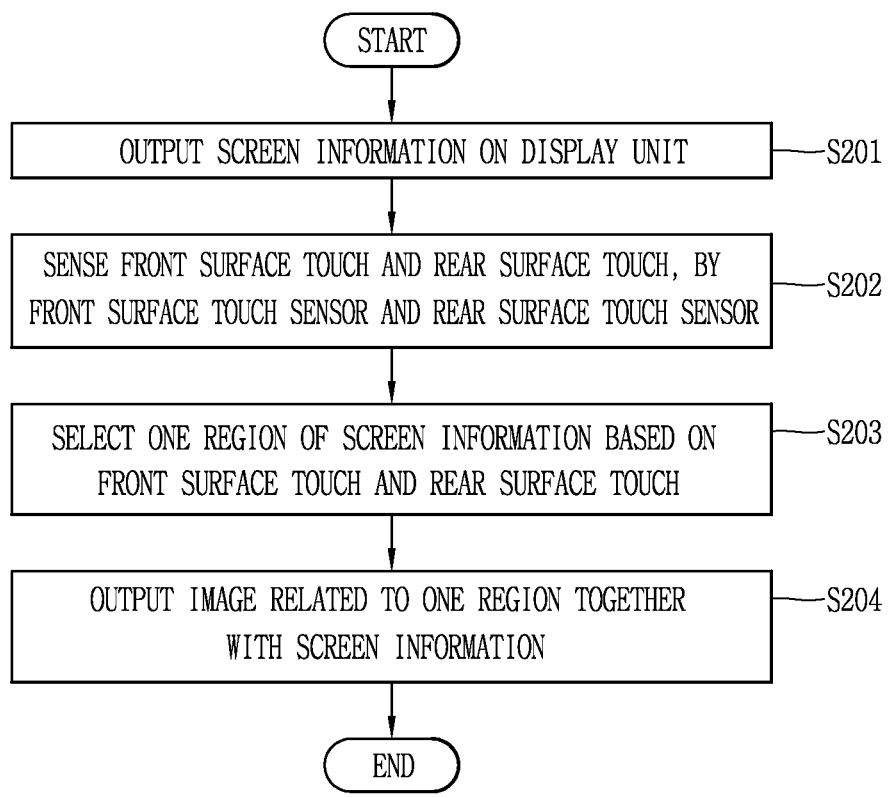
FIG. 3A is a flowchart illustrating a control method of a mobile terminal according to an embodiment of the present disclosure.
Figure 3B:
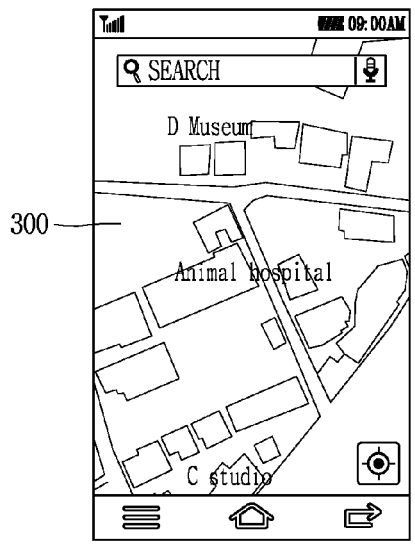
FIGS. 3B(a), 3B(b), 3B(c) and 3B(d) are conceptual views illustrating the control method of FIG. 3A.
Figure 3B:
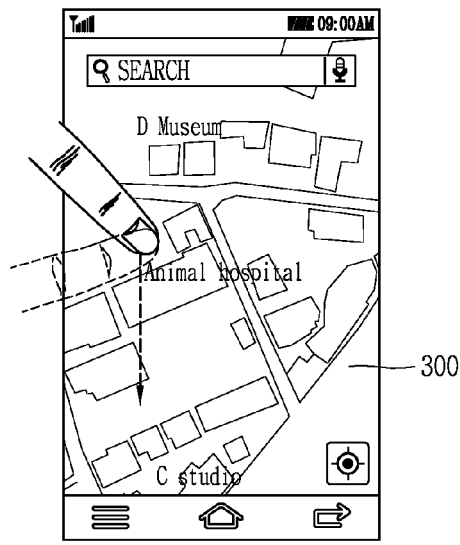
Figure 3B:
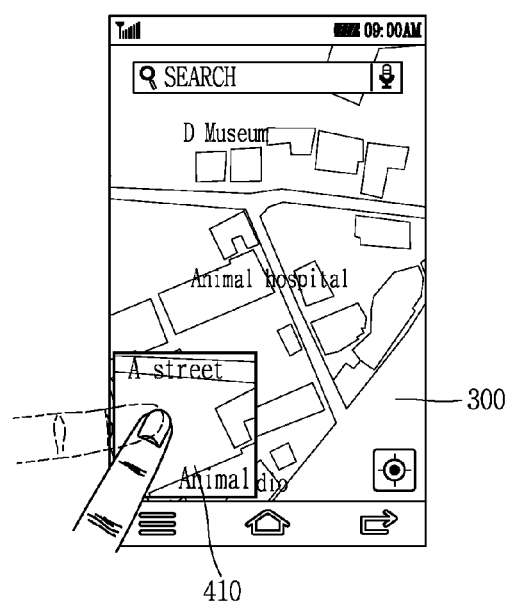
Figure 3B:
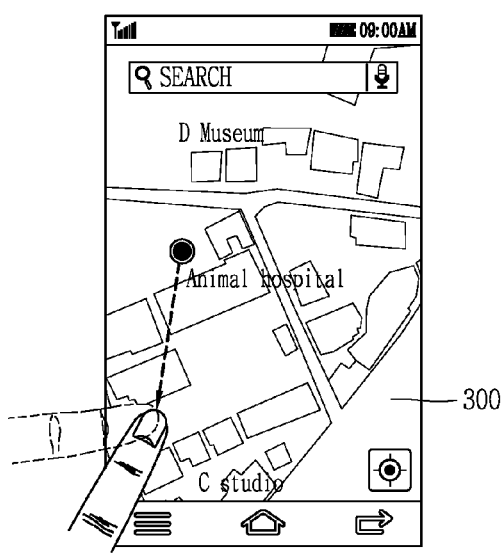

FIG. 3A is a flowchart illustrating a control method of a mobile terminal according to an embodiment of the present invention, and FIGS. 3B(a), 3B(b), 3B(c), and 3B(d) are conceptual views illustrating the control method of FIG. 3A.

The display unit is configured to output screen information S201. The screen information may correspond to a home screen page including a preset image, an execution screen for an application, a playback screen for a media file, a plurality of graphic images which receive touch inputs, and the like, and it will be understood that the screen information is not limited to such examples. For instance, the screen information may correspond to a map screen of a map application.

The screen information may correspond to a portion of continuous visual data. That is, another part of the visual data may be output when a touch input is applied to the first touch sensor 151a, such as a continuous touch and drag input, otherwise referred to as a dragging input. The display unit may output another part of the continuous visual data, based on a direction of the touch input. The touch input may correspond to a dragging input, a touch flick input, and the like. The controller 180 may change one region of the visual data output to the display unit, based on a touch input applied only to the second touch sensor.

For instance, when a map screen centered around a first position is output to the display unit, if a continuous touch input is applied to the first touch sensor or the second touch sensor, a map centered around a second position different from the first position may be displayed based on a direction of the continuous touch input.

However, when a touch input is applied to both the first touch sensor and the second touch sensor, the screen information may not be changed, even if a continuous touch input is sensed by the touch sensing unit. That is, if a touch input is applied to both the first touch sensor and the second touch sensor, the controller 180 ignores the touch input applied to the display unit.

Referring to FIG. 3A, after sensing a first touch input via the first touch sensor and a second touch input via the second touch sensor, S202, the controller 180 may select one region of the screen information based on the first touch input and the second touch input, shown for example at S203. More specifically, when a position of the first touch input and a corresponding position of the second touch input overlap each other with respect to each surface, the controller 180 may select a region of the screen information corresponding to the overlapped position. For the purposes of this discussion, the first touch input sensed via the first touch sensor and a second touch input sensed via the second touch sensor may be said to overlap when their positions and/or areas of touch on each respective surface intersect if virtually extended toward each other.

A range or size of the selected region may be set by a user. The range corresponds to a selected region on the display unit which may be extended based on the first and second touch inputs. For instance, the controller 180 may select a region obtained by dividing the display unit into quadrants based on a user's setting. The memory 170 may store therein data of screen information included in the selected region.

Referring to FIG. 3B(c), when a touch input such as a continuous touch input is applied to the first touch sensor and the second touch sensor, the screen information 300 may be continuously output.

However, if a region where the first touch input overlaps a corresponding region of the second touch input, the display unit may output an indicator indicating the overlapped position. However, the present invention is not limited to this. That is, the controller 180 may control the display unit such that the selected region is displayed on the overlapped position.

The controller 180 may also control the display unit to output a secondary image 410 shown in FIG. 3B(d) related to the overlapping region, together with the screen information 300, based on the first and second touch inputs, for example S204 of FIG. 3A.

For instance, when a continuous touch input, e.g., a dragging touch input, is applied via each of the overlapping first and second touch inputs the secondary image 410 may be displayed on the display unit. Referring to FIG. 3B(d), the secondary image 410 may correspond to a portion of the screen information 300 formed to have a preset size. Part of the screen information 300 may be obscured by the secondary image 410, or the secondary image 410 may be displayed in a semi-transparent manner.

When the first and second touch inputs are applied to regions corresponding to a particular region of the display unit, the secondary image 410 may be displayed. For instance, the particular region may correspond to a preset edge region of the display unit In one embodiment, when the first and second touch inputs are moved on the display unit, the secondary image 410 may be displayed to the particular region on the display unit to which the first and second touch inputs are applied.

The secondary image 410 may correspond or relate to a portion of the screen information 300, or it may correspond to an image obtained by enlarging a portion of the screen information 300. Further, the secondary image 410 may include visual data related to the screen information included in the selected region For example, when a map is displayed, the visual data may include position information such as distances and information related to buildings or points of interest included in the selected region.

In certain embodiments, a two-surface touch input applied to two surfaces of the display unit is differentiated from a touch input applied to the front surface or the rear surface. Based on the two-surface touch input, an image of a region of the screen information may be selectively output. Thus, a user may be provided with additional information on a portion of the screen information.

Figure 4A:
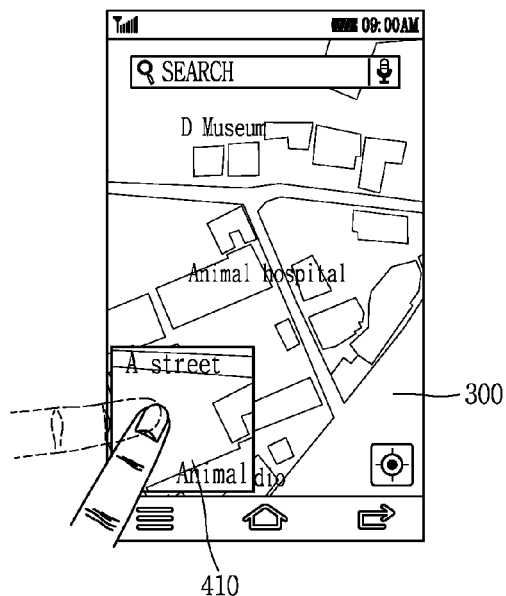
FIGS. 4A(a), 4A(b), 4A(c), 4A(d), 4B(a), 4B(b), 4B(c), 4C(a), 4C(b), and 4C(c) are conceptual views illustrating a control method of a mobile terminal for outputting an image.
Figure 4A:
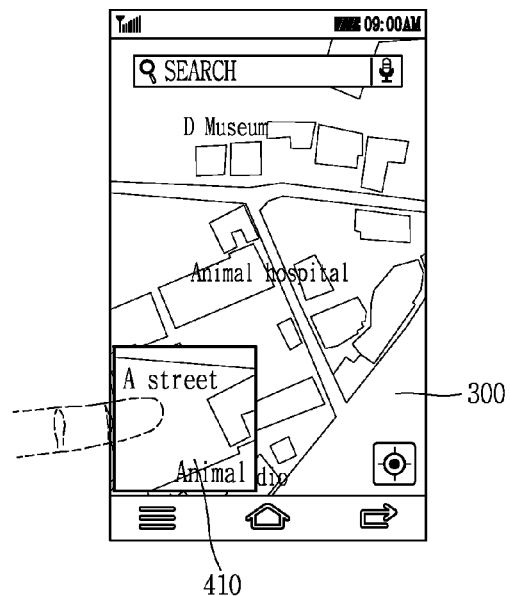
Figure 4A:
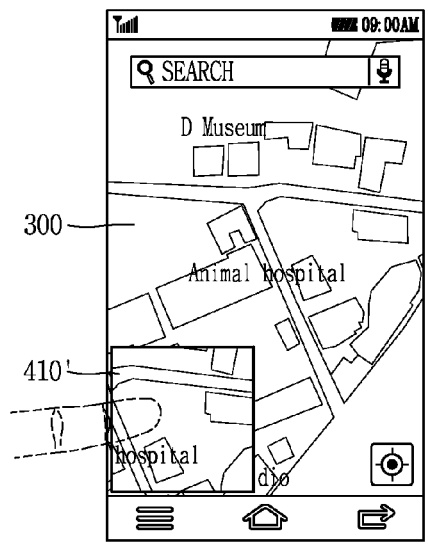
Figure 4A:
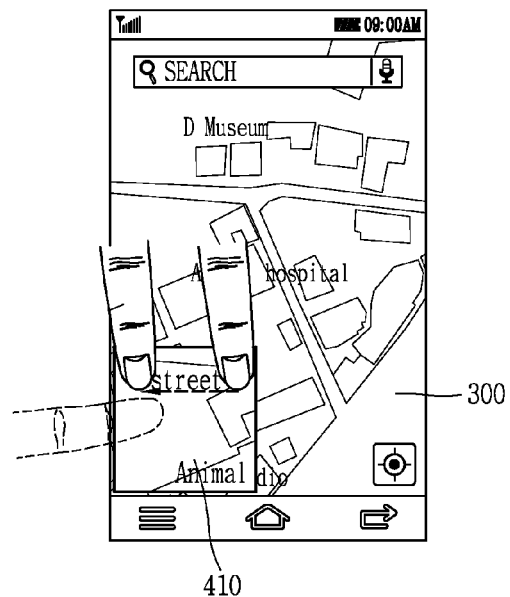
Figure 4B:
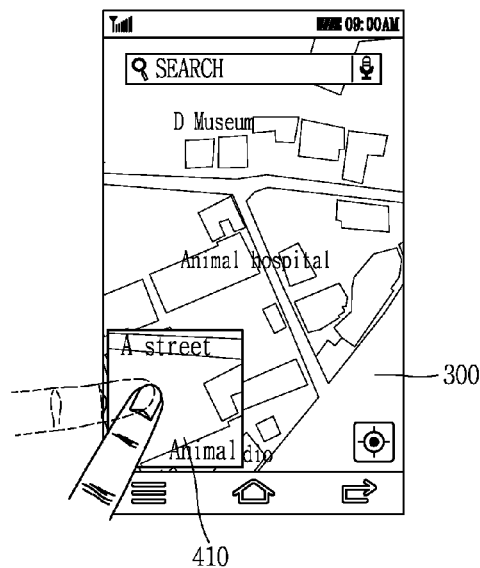
Figure 4B:
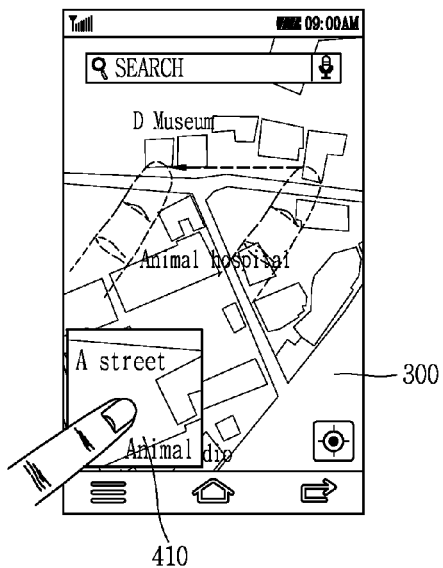
Figure 4B:
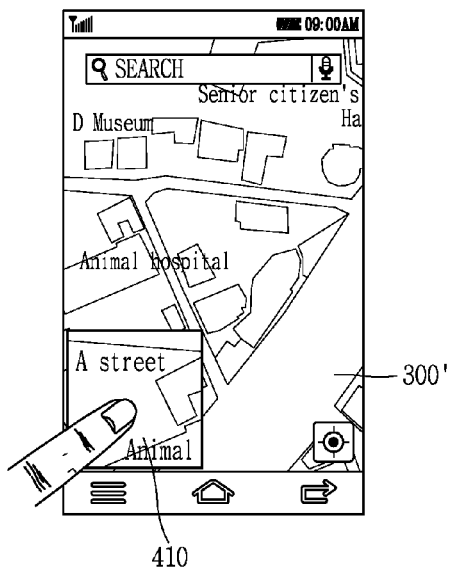
Figure 4C:
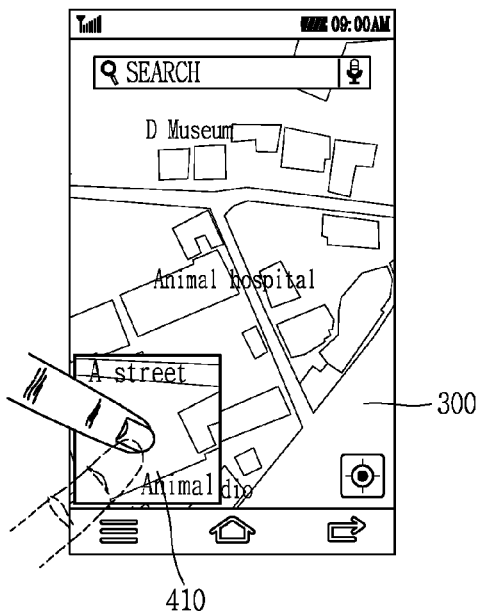
Figure 4C:
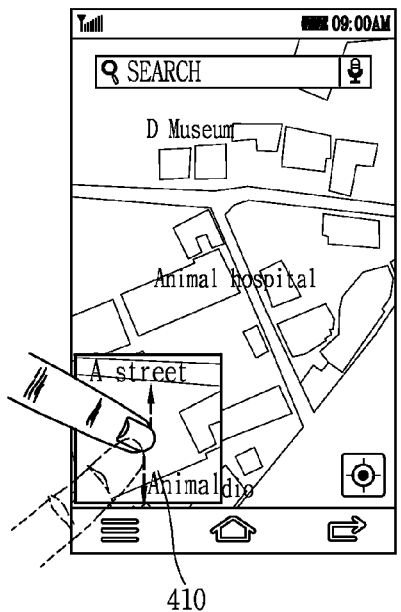
Figure 4C:
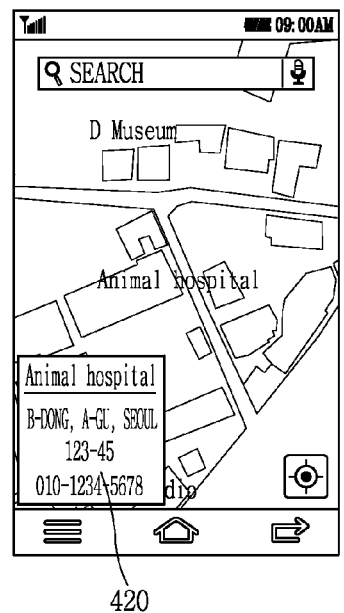

FIGS. 4A to 4C are conceptual views illustrating embodiments of a control method of the display unit in an output state of an image.

Referring to FIG. 4A(a) to 4A(d), in one embodiment the display unit outputs the secondary image 410 together with the screen information 300 based on the first and second touch inputs. The secondary image 410 may be displayed while the first and second touch inputs are applied. Referring to FIG. 4A(b), the controller 180 controls the display unit to continue outputting the secondary image 410 after the first touch input is released if the second touch input is maintained.

Referring to FIGS. 4A (c) and 4A(d), the secondary image 410 may be changed based on an additional touch input sensed by the first touch sensor (after the initial first touch input has been released) while the second touch input is maintained.

In one embodiment, when a dragging touch input is applied while the second touch input is maintained, the secondary image 410 may be changed into another secondary image 410'. For instance, when the secondary image 410 corresponds to a region of a map centering around a first location, the changed secondary image 410' may be a map centered around another location on the map. A position change from centering around the first location to centering around the second location is determined by the additional touch input. The changed secondary image 410' may be displayed together with the screen information 300 while the second touch input is maintained.

Thus, a user may change the secondary image into another secondary image while the screen information is output, where the changed secondary image includes additional or enhanced information regarding the secondary image. In this way, when the secondary image 410 corresponds to an enlarged part of the map, a user may be provided with various views of the map in an enlarged manner, based on the touch inputs.

Referring to alternate embodiments shown in FIGS. 4B(a) to 4B(c), as discussed the controller 180 may control the display unit to output the secondary image 410 together with the screen information 300 based on the first and second touch inputs. If the second touch input is released while the first touch input applied to the secondary image 410 is maintained, secondary image 410 may be continuously displayed.

Referring to FIGS. 4B(b) and 4B(c), if an additional touch input is received (after the initial second touch input is released) via the second touch sensor while the first touch input is maintained, the screen information 300 may be changed to another view or another image. If the second touch sensor senses an additional input such as a dragging input while the first touch input is maintained, as shown in FIG. 4B(b), the view of the screen information 300 may be changed to another view or screen as shown at 300' based on the additional touch input, as shown in FIG. 4B(c).

For example, when the screen information 300 corresponds to a map centered at a first location, another view 300' of the map may be output centered around a second location on the map that is different from the first location.

Referring now to the embodiments shown in FIGS. 4C(a) to 4C(c), when the first and second touch sensors sense additional touch inputs, the controller 180 may control the display unit to change the information displayed in the secondary image 410. The additional touch inputs may correspond to the first and second touch inputs being applied in different directions on a region of the secondary image 410 while the first touch input and the second touch input are maintained, as shown in FIG. 4C(b). The different directions may correspond to directions opposite to each other, or directions crossing each other. Alternatively, the additional touch inputs may be performed by changing a distance between the position of the first touch input and the position of the second touch input.

In one embodiment, when the secondary image 410 corresponds to a region on a map, secondary information 420 may be displayed which includes information corresponding to the displayed location, such as visual information including text. The text may include information related to the displayed location such as an address of a location included in the secondary image 410, a building name, a shop name, a phone number of a shop, and the like, as shown in FIG. 4C(c).

Figure 5A:
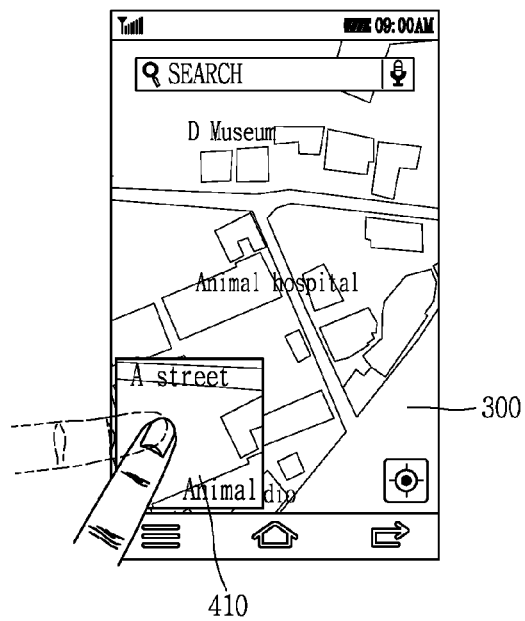
FIGS. 5A(a), 5A(b), 5A(c), 5B(a), 5B(b), 5B(c), 5B(d), 5C(a), 5C(b), 5C(c), 5C(d), 5D(a), 5D(b), and 5D(c) are conceptual views illustrating a control method of a mobile terminal for outputting images according to release of a touch input, according to another embodiment of the present disclosure.
Figure 5A:
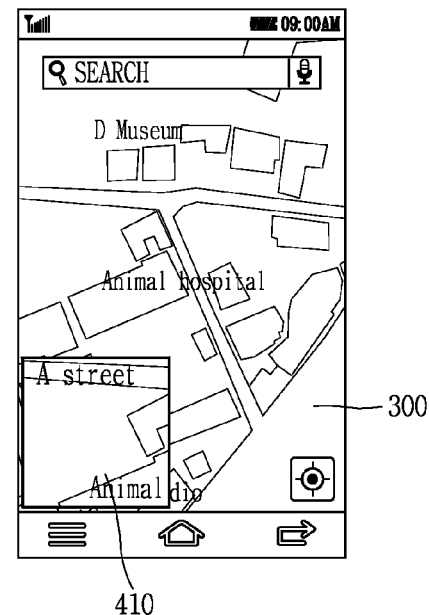
Figure 5A:
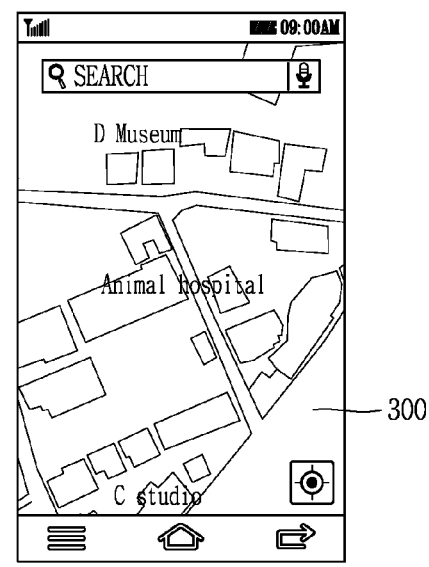

Referring now to the embodiments shown in FIGS. 5A(a) to 5A(c), the controller may control the display unit to no longer display the secondary image 410 when the first and second touch inputs are released. That is, the controller 180 controls the display unit to output only the screen information 300 when the first and second touch sensors no longer sense the touch inputs, as shown in FIG. 5A(c). Thus, a user may be provided with the secondary image 410 only while the first and second touch inputs are maintained.

Figure 5B:
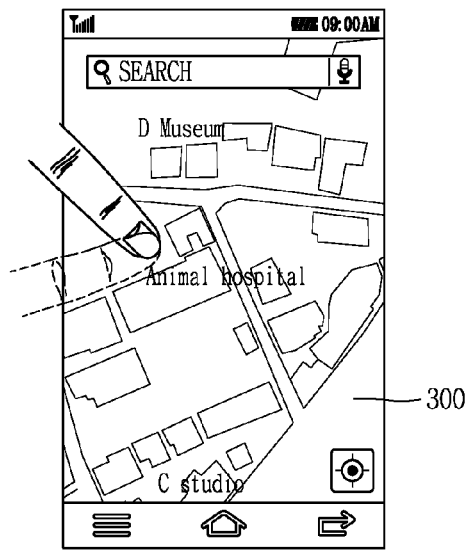
Figure 5B:
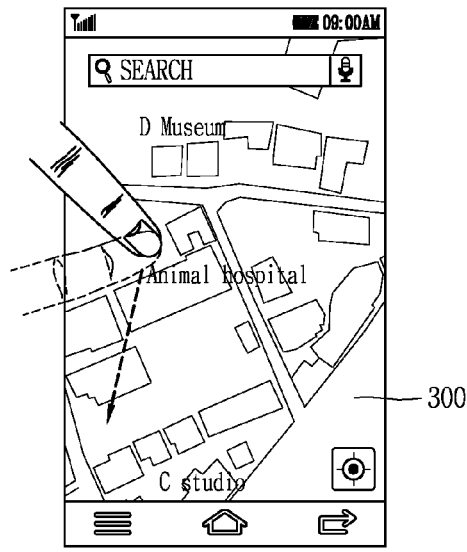
Figure 5B:
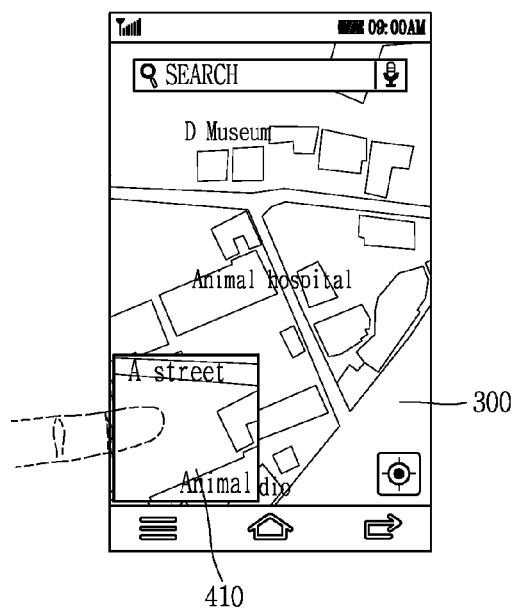
Figure 5B:
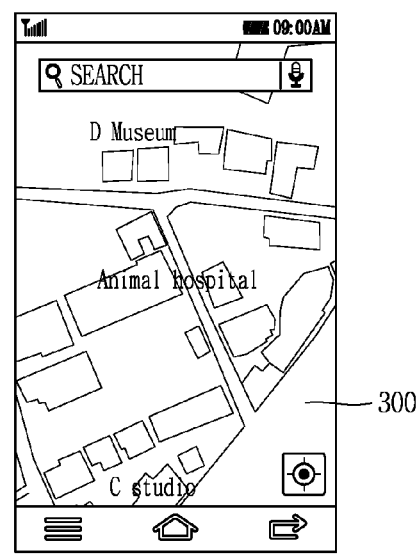

Referring to FIGS. 5B(a), 5B(b) and 5B(c), the controller 180 may be configured to select one region of the screen information 300 based on the first and second touch inputs and continue outputting the screen information 300 even when the first and second touch inputs are moved on the screen information 300. While displaying screen information 300 in FIG. 5B(a), the controller 180 selects a region based on the first and second touch inputs in FIG. 5B(b), and outputs the secondary image 410 related to the selected region in FIG. 5B(c). Further, the controller 180 may control the display unit to continuously output the secondary image 410 with the screen information 300 while the second touch input is maintained or continuously applied. The secondary image may stop being displayed once no further touch inputs are received, as shown in FIG. 5B(c).

Figure 5C:
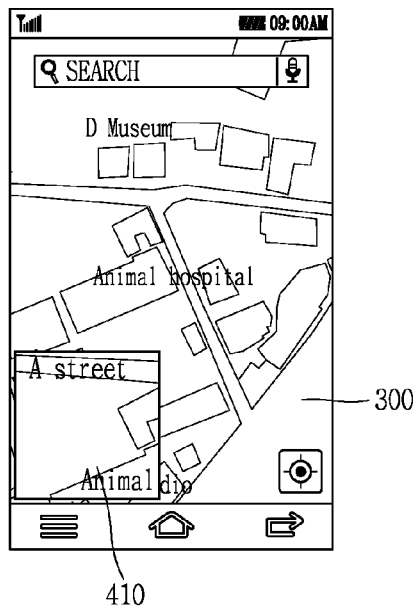
Figure 5C:
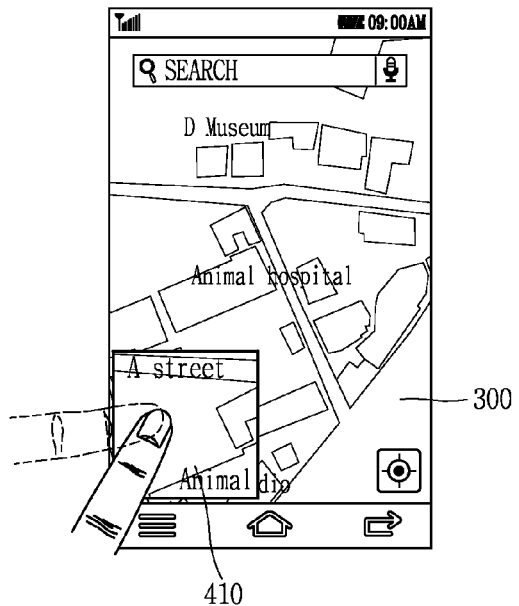
Figure 5C:
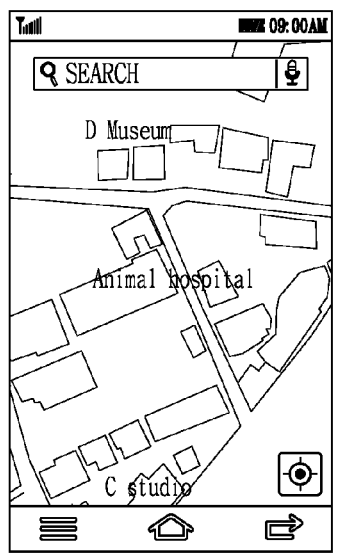
Figure 5C:
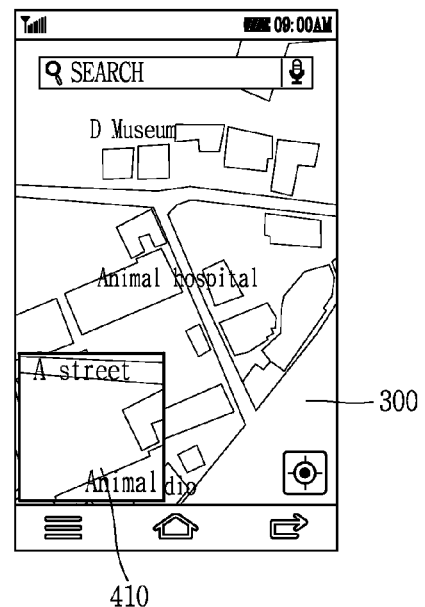

Referring to FIGS. 5C(a), 5C(d), in some embodiments the secondary image 410 is no longer displayed when the first and second touch inputs are released and a preset amount of time has lapsed.

Referring to FIGS. 5C(b) and 5C(c), in some embodiments if the first and second touch inputs are reapplied after the first and second touch inputs have been initially released, and the inputs are reapplied while the secondary image 410 is still displayed, the secondary image 410 may be continuously displayed. That is, if the first and second touch inputs are re-applied within the preset amount of time after the first and second touch inputs are released, the secondary image 410 may be continuously output with the screen information 300.

In other embodiments, if at least one of the first touch input and the second touch input is re-applied to the secondary image 410 within the preset amount of time after the first and second touch inputs are released, the controller 180 may control the display unit to continuously output the secondary image 410 together with the screen information 300.

Although not shown, in some embodiments the secondary image 410 or the screen information 300 may be changed based on the first or second touch input when the secondary image 410 is output after the first touch input and/or the second touch input is reapplied after they are initially released.

Figure 5D:
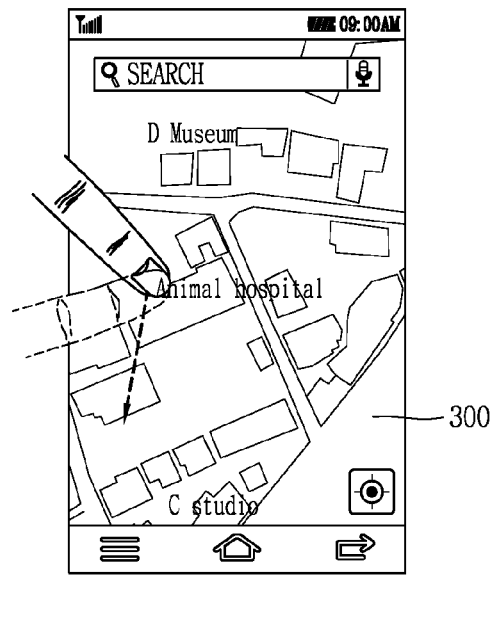
Figure 5D:
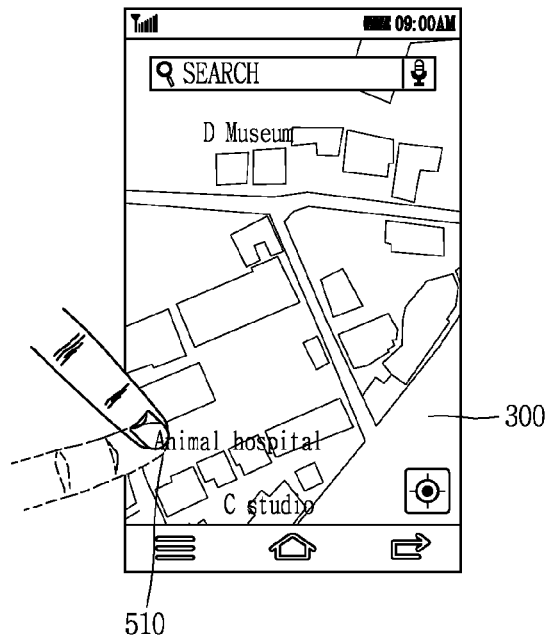
Figure 5D:
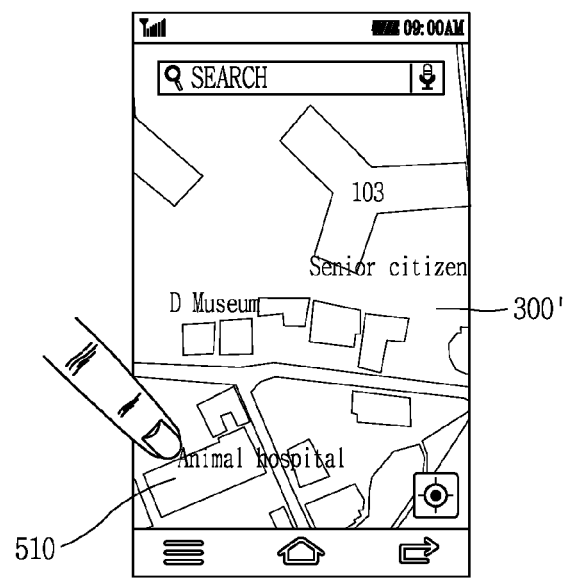

Referring to FIGS. 5D(a) and 5D(b), in some embodiments if the first and second touch inputs are applied while the screen information 300 is displayed, the controller 180 may control the display unit to output related information 510 (for example, a displayed description of "Animal hospital") corresponding to a region selected by the first and second touch inputs. If the first and second touch inputs are moved together the display unit outputs the related information 510 on a position corresponding to the first and second touch inputs.

In an embodiment, when the screen information 300 corresponds to a map, the related information 510 may correspond to a graphic image or text included in the map indicating a particular location or point of interest on the map. In response to moving the first and second touch inputs, the related information 510 may be moved to correspond to the movement. When the first or the second input is released, as shown in FIG. 5D(c), changed screen information 300' may be displayed which displays the map to correspond to the moved related information 501. For example, when the text description "Animal hospital" is moved by the first and second touch input, and the second touch input is released, the displayed map is changed so that the location on the map corresponding to the Animal hospital is displayed at the new location of the displayed text description "Animal hospital". Thus, a user may be provided with screen information which has been moved centering around a selected position.

Figure 6A:
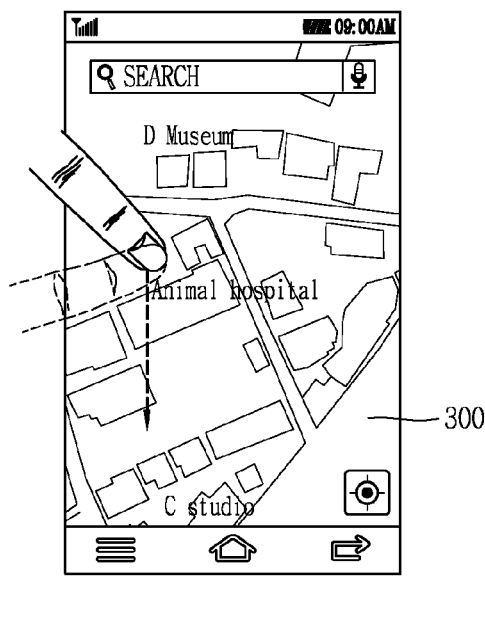
FIGS. 6A(a), 6A(b), 6A(c), 6A(d), 6B(a), 6B(b), 6B(c), 6B(d), 6C(a), 6C(b), and 6C(c) are conceptual views illustrating a control method of a mobile terminal for outputting screen information according to another embodiment, according to another embodiment of the present disclosure.
Figure 6A:
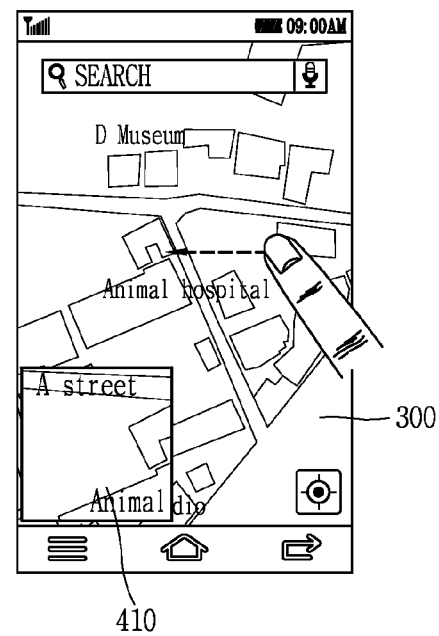
Figure 6A:
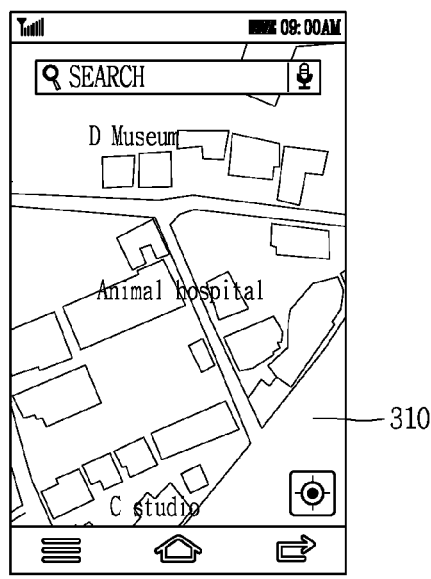
Figure 6A:
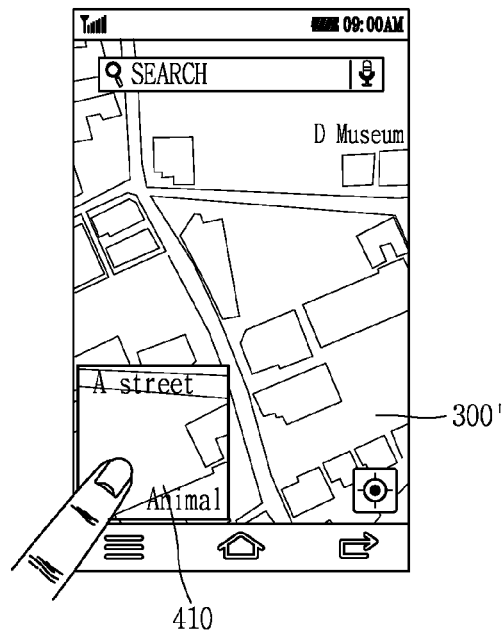

Referring to FIGS. 6A(c) and 6A(d), the controller 180 controls the display unit to once again display the original screen information 300 based on a touch input applied to the secondary image 410. For example, in response to a touch input to the secondary image 410, the original view of the map may be displayed again in the view of the map 300.

Alternatively, additional screen information 310 may be displayed based on a location displayed in a view of the map of the secondary image 410. Further, the controller 180 may control the display unit to no longer display the secondary image 410. For example, in response to a touch input to the secondary image 410, another portion of the map may be displayed corresponding to a position included in the secondary image 410.

Figure 6B:
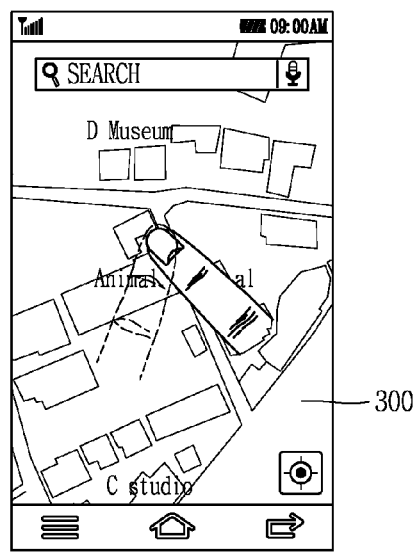
Figure 6B:
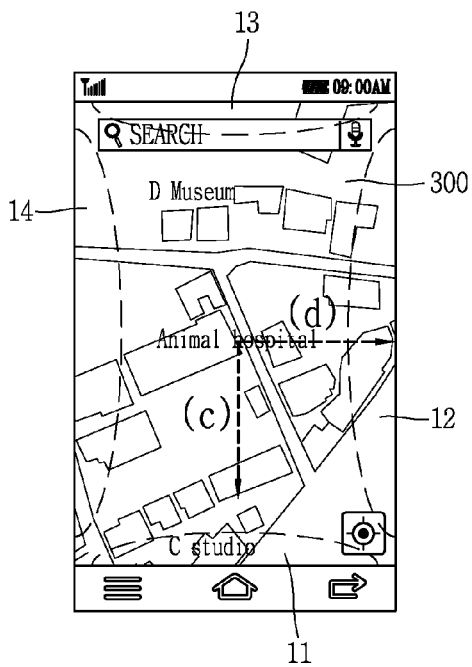
Figure 6B:
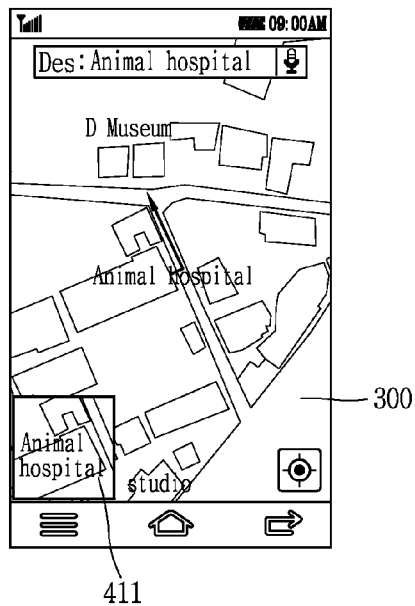
Figure 6B:
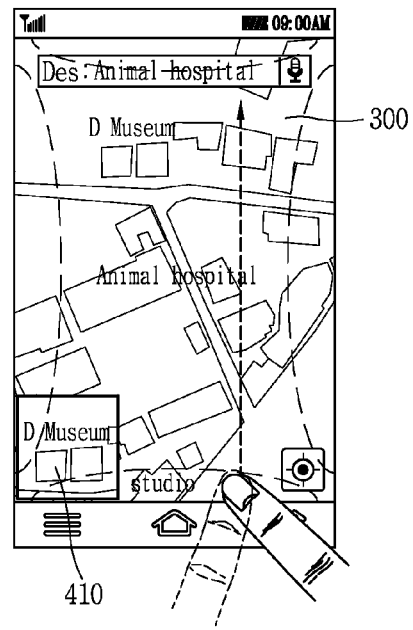

Thus, a user may store his or her desired information displayed in the secondary image 410, and may view screen information included in the secondary image 410 by using the data included in the secondary image 410. FIGS. 6B(a) to 6B(d) illustrate methods of activating a different function based on where a touch input is applied. The controller 180 may select a region of the screen information 300 based on overlapping first and second touch inputs.

Referring to FIG. 6B(b), the display unit may be divided into a plurality of function regions each corresponding to a particular function. For instance, regions 11, 12, 13, 14 shown along the edges of the display may correspond to four function regions. The controller 180 may perform different functions when the first and second touch inputs are received, terminated, initiated, or otherwise detected at the various function regions 11, 12, 13, 14.

Referring to the embodiment shown in FIGS. 6B(b) and 6B(c), when the first and second touch inputs are released at the first function region 11, the secondary image 410 is displayed together with the screen information 300, and the controller may also execute a first function corresponding to function region 11. The first function may correspond to setting a currently displayed location in the selected region as a destination for searching for directions. A control window may be displayed indicating the currently displayed location as a destination.

In another example referring to FIGS. 6B(b) and 6B(d), when the first and second touch inputs are released at the second function region 12, the controller 180 may set a currently displayed location in the selected region as a starting point for a search for directions. A control window indicating the starting point may be displayed.

A user may set the starting point of the search and then set a destination based on the first and second touch inputs. That is, the user may select a region based on the first and second touch inputs, and then execute a function related to the selected region by releasing the first and second touch inputs at a preset position.

Figure 6C:
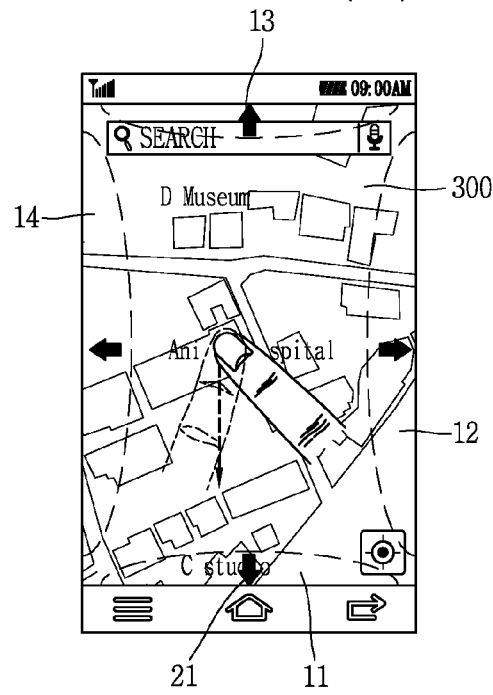
Figure 6C:
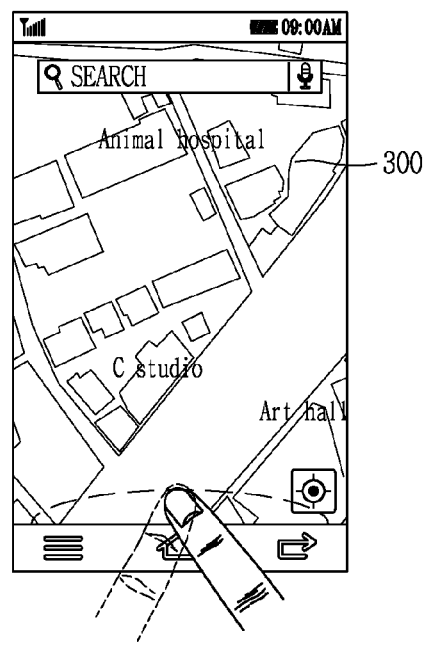
Figure 6C:
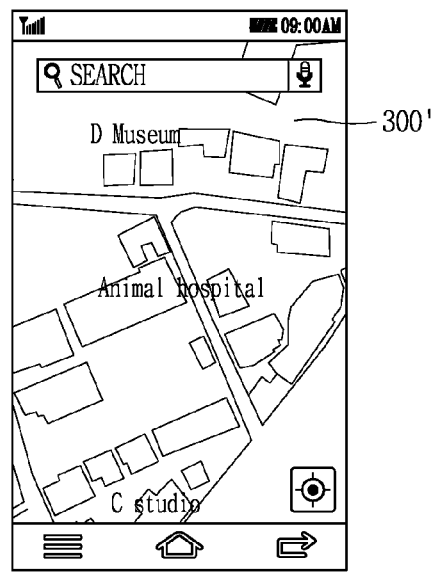

Referring to the embodiments shown in FIGS. 6C(a) to 6C(c), a method of changing the screen information 300 based on the first and second touch inputs will be discussed. When the overlapping first and second touch inputs are applied, the controller 180 may select a region corresponding to the inputs and store information of the selected region in memory. Indicators may be displayed to the function regions 11, 12, 13, 14 when the first and second touch inputs are applied in the form of directional keys. The directional keys may be displayed to indicate a location, direction, area, or boundaries of the function regions. Alternatively, text may be displayed as the indicators.

In one embodiment, changed screen information 300' from the screen information 300 may be displayed based on a function region to which the first and second touch inputs are applied. For instance, when the first and second touch inputs are applied to function region 11, the changed screen information 300' may correspond to a lower region of the screen information 300.

In another embodiment, when the first and second touch inputs are applied to function region 12 adjacent to a right edge of the display unit, information extending to the right side of screen information 300 may be displayed as changed screen information 300'.

Although not shown, when the first and second touch inputs are applied to function region 11, the controller 180 may sequentially output information extending into the lower region of screen information 300, such as by scrolling.

However, when the first and second touch inputs are released, the screen information 300 may be displayed again, for example, a scrolled map view may snap back to the original location when the touch inputs are released. In such an embodiment, a user may scroll or move around initially displayed information, then be provided with the original or initial view simply by releasing the touch inputs.

Figure 7A:
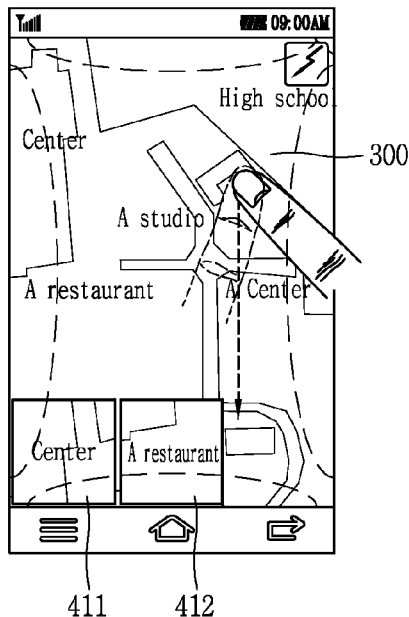
FIGS. 7A(a), 7A(b), 7A(c), 7B(a), 7B(b), 7B(c), 7C(a), 7C(b), and 7C(c) are conceptual views illustrating a control method of a mobile terminal for outputting an image, according to another embodiment of the present disclosure.
Figure 7A:
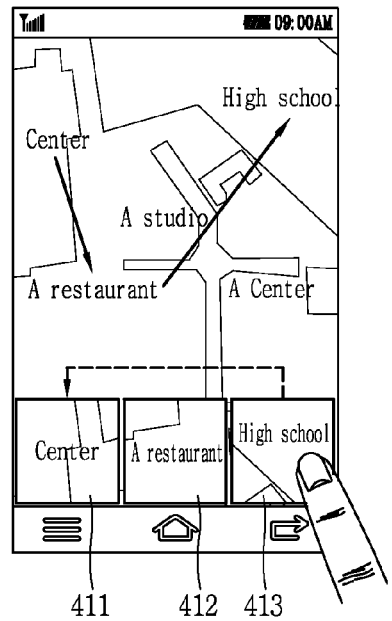
Figure 7A:
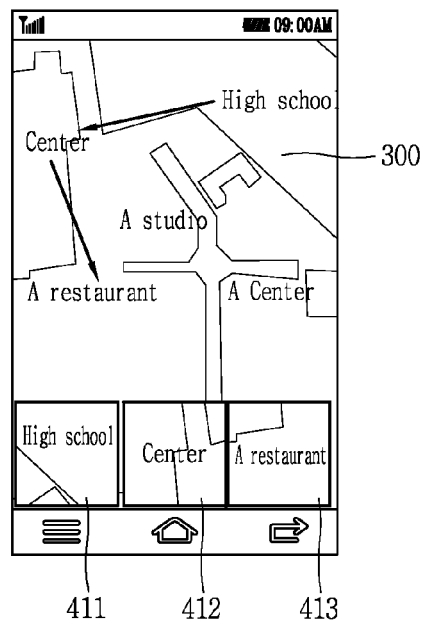

Referring to the embodiments of FIGS. 7A(a) to 7A(c), the controller 180 may select a region of the screen information 300 based on the first and second touch inputs as discussed. Upon the selection, selection images 411, 412, 413 may be displayed with the screen information 300. The selection images 411, 412, 413 may include different views, locations, details, related information, and the like related to selections performed by the first and second touch inputs. For instance, when the screen information 300 corresponds to a map, the selection images 411, 412, 413 may include different selected locations. The selection images 411, 412, 413 may be displayed in the same size, or may be displayed in different sizes, with distinctive display effects based on a number of factors, such as order in which they were selected, proximity to a current location, relevance to a search, and the like. The various display properties may be performed according to a user setting or based on detected factors as discussed.

Additionally, images corresponding to selections of the first and second touch inputs may be displayed in another embodiment. When the screen information corresponds to a map, the controller 180 may set a location depicted in a selected image as a destination for directions or a stop along a direction path. In one embodiment, direction information may be provided to the user which connects a number of locations corresponding to the locations shown in selection images 411, 412, 413. The direction information may be provided so that the order of the locations in the directions corresponds to the order in which the selection images 411, 412, 413 are displayed.

For instance, the controller 180 may select selection image 411 as a starting point, selection image 412 as a first stop, and selection image 413 as a final destination. Then, the controller 180 may control the display unit to output screen information including the determined path.

Further, the controller 180 may change an output position of the selection images 411, 412, 413, based on a touch input applied to at least one of the images. For instance, the display unit may place selection image 413, selection image 411, and selection image 412, in order based on a touch input rearranging selection image 413. In response to a rearranging of the selection images, the controller 180 may recalculate the direction information. Thus in the example above, the controller may set selection image 413 as the starting point, selection image 411 as a first stop, and selection image 412 as the final destination. The map view may also be changed to show the updated direction information in response to a rearranging of the images.

Figure 7B:
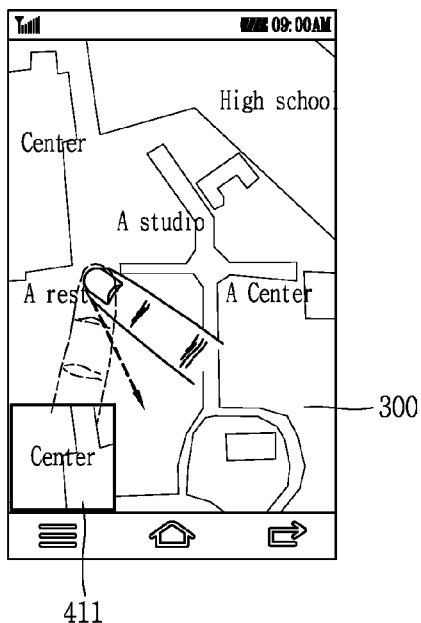
Figure 7B:
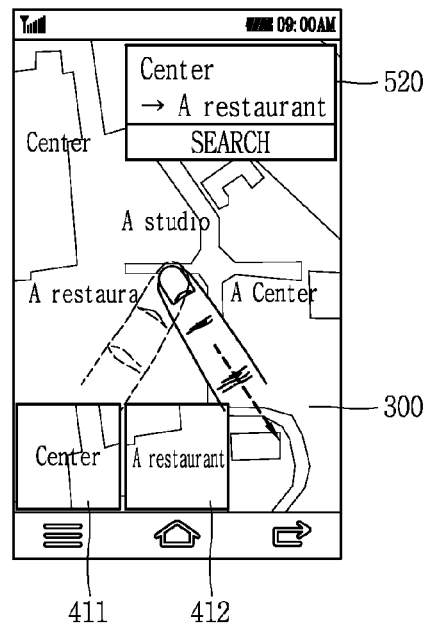
Figure 7B:
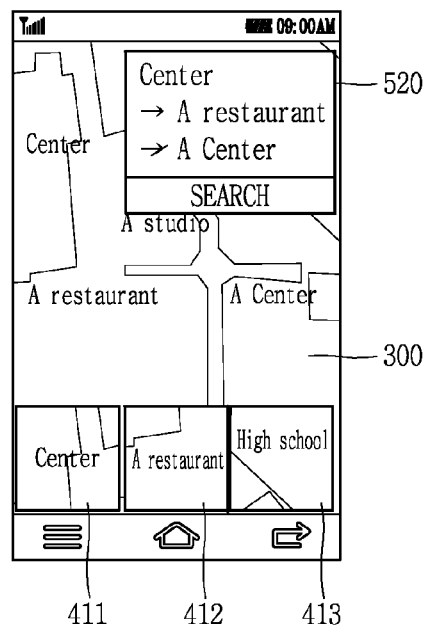

Referring to embodiments shown in FIGS. 7B(a) to 7B(c), a method of outputting a control window related to images will be discussed. As discussed, selection images 411, 412, 413 corresponding to different regions selected based on the first and second touch inputs may be displayed. The selection images 411, 412, 413 may include different location information.

When a plurality of selection images are displayed, a first control window 520 may also be displayed which includes information related to the locations corresponding to the selection images. The first control window 520 may sequentially displays text of location information included in the selected regions. Further, a graphic image may be included to indicate an option for route searching.

Although not shown, in a configuration where direction information is requested or will be requested, the controller 180 may change a destination, starting point, or intermediate stop based on a touch input applied to the first control window 520.

Figure 7C:
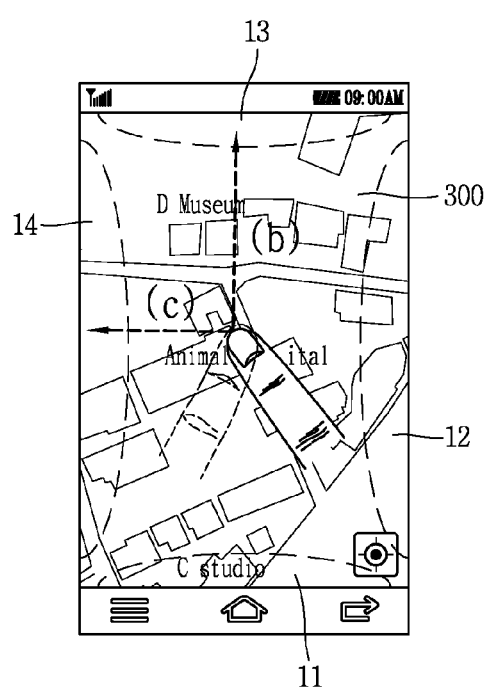
Figure 7C:
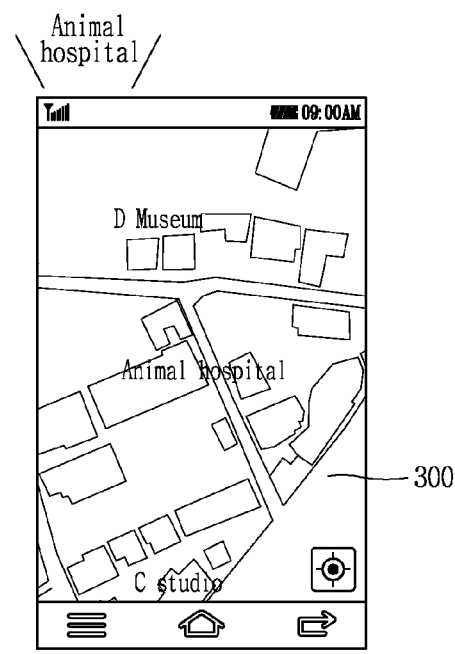
Figure 7C:
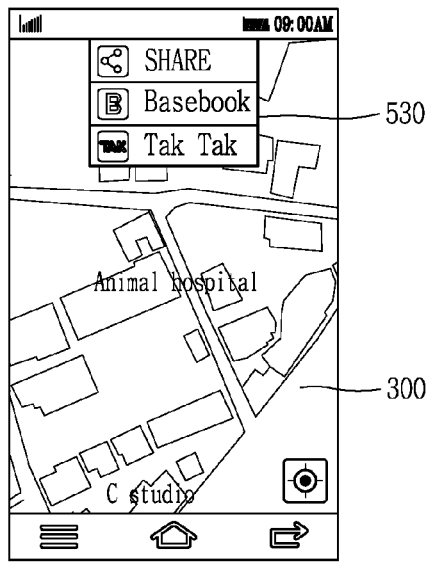

Referring to the embodiments of FIGS. 7C(a) to 7C(c), a method of executing functions corresponding to function regions will be described. Referring to FIG. 7C(a), the display unit may include function regions 11, 12, 13, 14 corresponding to various regions or edges of the display as shown.

Referring to FIGS. 7C(a) and 7C(b), a function region is selected based on the first and second touch inputs and a function may be performed. For example, when the first and second touch inputs are released at function region 13, the controller 180 may execute a function for outputting audio information related to a location included in a selected region of the screen information.

In another embodiment, referring to FIGS. 7C(a) and 7C(c), when the first and second touch inputs are released from function region 14, the controller 180 may execute a function corresponding to function region 14, such as a function for sharing information with other terminals or users. When the first and second touch inputs are released at function region 14, a control window 530 may be displayed for sharing location information included in the selected region. The control window 530 may include a plurality of graphic images, buttons, or icons for selecting options for sharing the information.

Figure 8A:
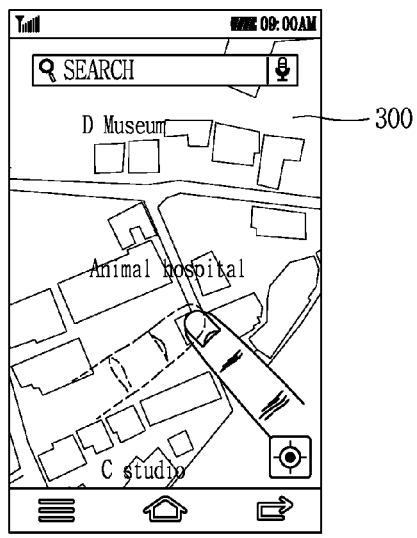
FIGS. 8(*a*) and 8(*b*) are conceptual views illustrating a control method of a mobile terminal for executing various functions related to selected information, according to an embodiment of the present disclosure.
Figure 8B:
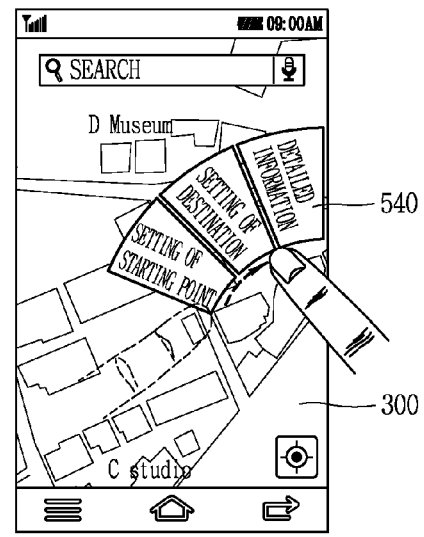

Referring to embodiments of FIGS. 8(a) and 8(b) a method for executing various functions related to selected information will be described. The controller 180 selects a region on the screen information based on the first and second touch inputs. In one embodiment, a control window 540 may be displayed based on an additional touch input applied to the first or second touch sensors. In one embodiment, the control window 540 is displayed when the first and second touch inputs are applied in different directions, for example a motion of a thumb and forefinger twisting apart, or two fingers being moved apart from each other. In another embodiment, the control window 540 is displayed when the distance between the first touch input and the second touch input exceeds a set value.

The control window 540 may include at least one function related to information included in the selected region of the screen information. For instance, when the screen information 300 corresponds to a map, the function may be setting the selected region as a starting point, an intermediate stop, or a destination for directions, or the function may include providing detailed information of the selected region. In these embodiments, a user may select a region on the screen information based on first and second touch inputs, and execute a function related to the selected region by applying an additional touch input.

Figure 9A:
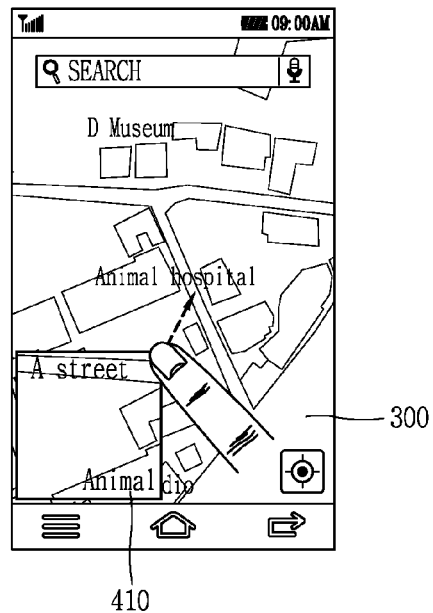
FIGS. 9A(a), 9A(b), 9A(c), 9B(a), and 9B(b) are conceptual views illustrating a control method of a mobile terminal for changing an image, according to an embodiment of the present disclosure.
Figure 9A:
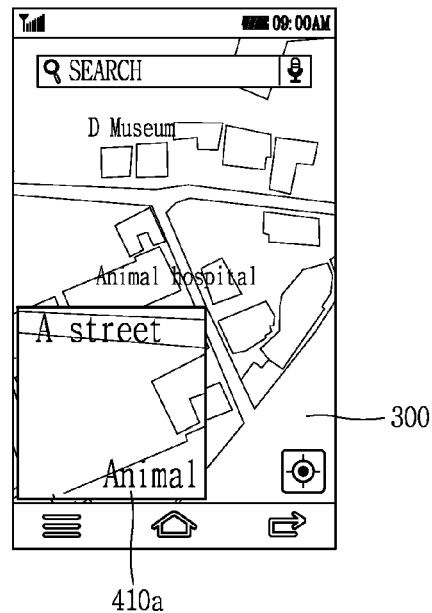
Figure 9A:
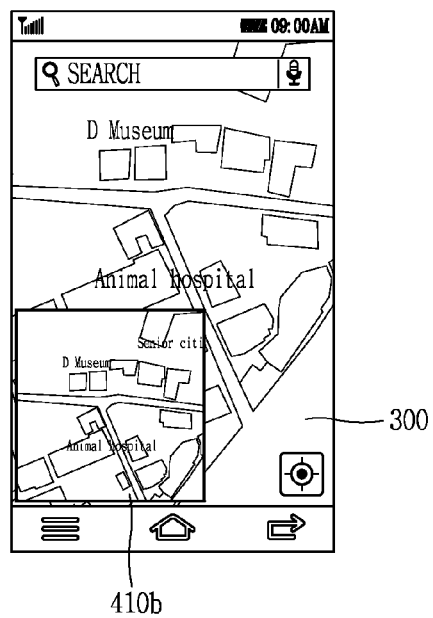
Figure 9B:
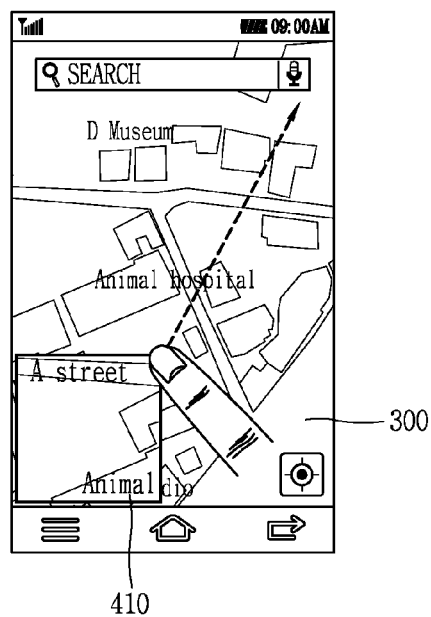
Figure 9B:
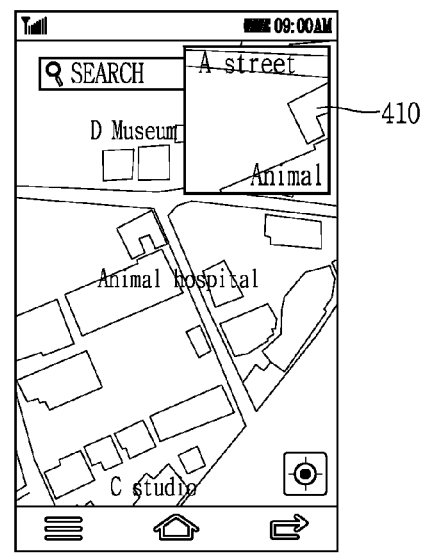

FIGS. 9A and 9B are conceptual views illustrating embodiments of a method for changing images. Referring to FIGS. 9A(a) to 9A(c), the controller 180 controls the display unit to output a secondary image 410 related to a region selected based on the first and second touch inputs, as previously discussed. The controller 180 may also change a size of the secondary image 410 based on a touch input applied to the secondary image 410. For instance, the controller 180 may enlarge or reduce the size of the secondary image 410 based on a dragging touch input applied to an edge region of the secondary image 410.

Referring to FIGS. 9A (a) and 9A(b), the controller 180 may enlarge the size of the secondary image 410 to display an enlarged image 410a based on the touch input applied to the secondary image 410. The enlarged image 410a may include detailed information related to a location included in the secondary image 410.

In another embodiment referring to FIGS. 9A(a) and 9A(c), the controller 180 may extend the secondary image 410 to display an extended image 410b based on a touch input applied to the secondary image 410. The extended image 410b may include location information of a region shown in the screen information 300. Although not shown, in another embodiment the secondary image 410 may be reduced based on the touch input. When the secondary image 410 is reduced, a smaller region may be displayed within the reduced image, or the view may be zoomed in or moved to maintain the same view of a location within the reduced image size.

Referring to FIGS. 9B(a) and 9B(b), the controller 180 may move the secondary image 410 to another region on the display unit based on a touch input applied to the secondary image 410. Accordingly, a user may view a region of the screen information obscured by the secondary image 410. In this embodiment, a user may also change information included in the secondary image based on a touch input applied to the secondary image.

Figure 10A:
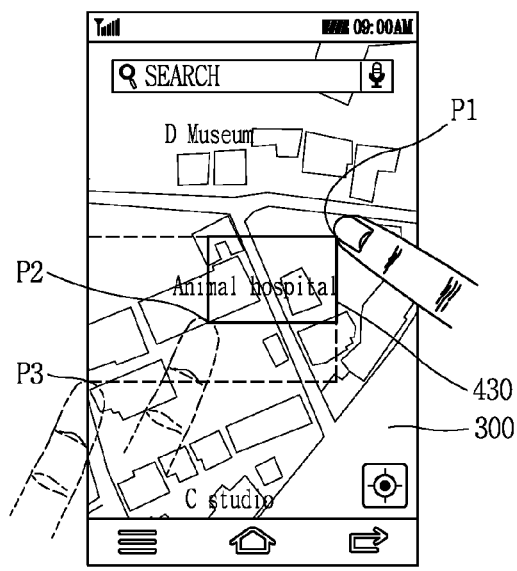
FIGS. 10A(a), 10A(b), 10B(a), and 10B(b) are conceptual views illustrating a control method of a mobile terminal for forming a selected region as an image, according to an embodiment of the present disclosure.
Figure 10A:
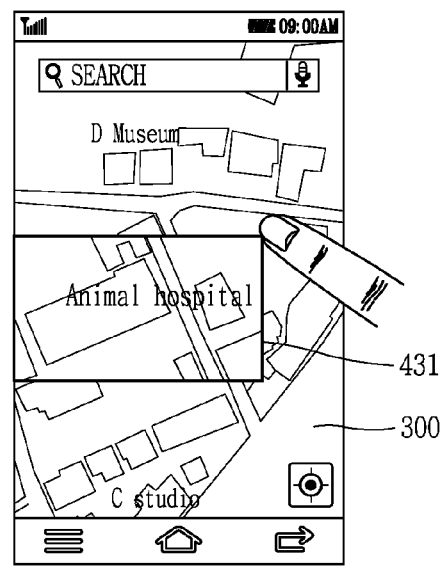

FIGS. 10A(a) to 10B(b) are conceptual views illustrating embodiments of a method for forming a selected region as an image. Referring to FIGS. 10A(a) and 10A(b), the controller 180 selects a region on the screen information based on the location of touch inputs applied to the first and second touch sensors. The controller 180 may select a region 430 based on a first point (P1) and a second point (P2) based on touch inputs applied to the first point (P1) and the second point (P2). For instance, the region 430 may be a rectangular region having the first point (P1) and the second point (P2) as vertices.

When the second point (P2) is moved to a third point (P3) by a touch input, the image may be changed to a changed image 431 defined by at least the first point (P1) and the third point (P3). However, in some embodiments, the information displayed in the changed image 431 includes the information originally displayed in the original image 430. Accordingly, the changed image 431 may include an enlarged view of the original image 430. The changed image 431 may be displayed adjacent to the first point (P1).

Although not shown, when a touch point of the first touch input is moved after the second touch input has been released, the display position of the changed image 431 may be moved.

Figure 10B:
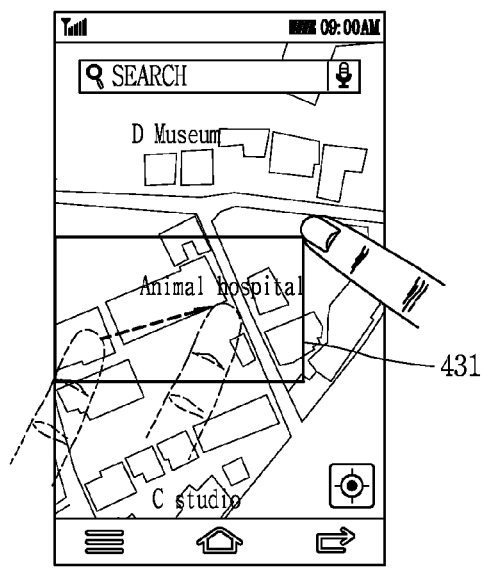
Figure 10B:
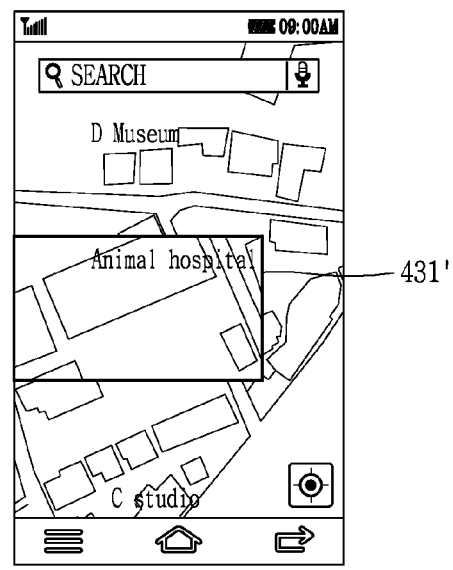

Referring to FIGS. 10B(a) and 10B(b), the changed image 431 may only be displayed while the first touch input is maintained. The changed image 431' may be altered or moved based on an additional touch input applied to the changed image 431 while the first touch input is maintained. For instance, the changed image 431 may be changed to include another region of the screen information based on an additional input such as a dragging touch input.

Figure 11A:
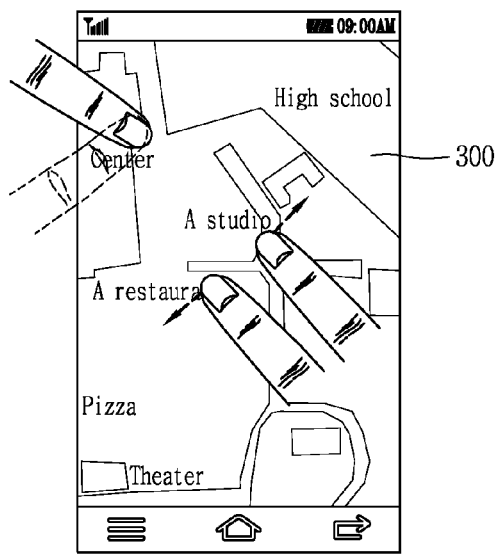
FIGS. 11A(a), 11A(b), 11A(c), 11B(a), 11B(b), and 11B (c) are conceptual views illustrating a control method of a mobile terminal for outputting screen information based on a two-surface touch input, according to an embodiment of the present disclosure.
Figure 11A:
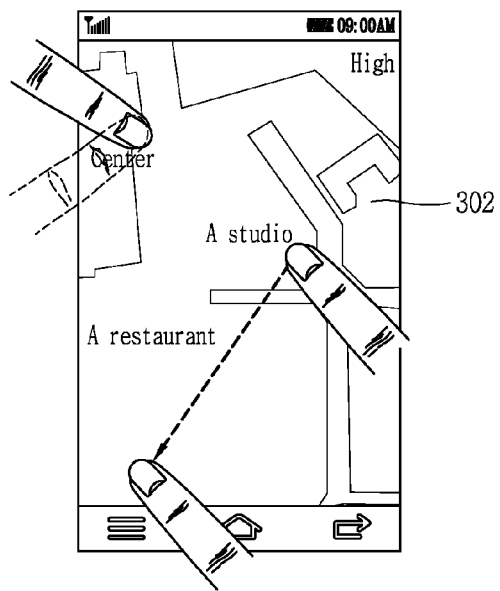
Figure 11A:
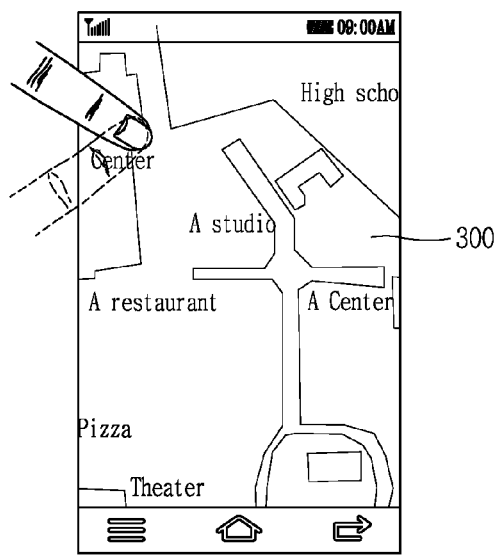

FIGS. 11A(a) to 11B(c) are conceptual views illustrating embodiments of a method for displaying screen information based on a two-surface touch input. Referring to FIGS. 11A(a) to 11A(c), the controller 180 selects a region of the screen information based on first and second touch inputs applied to the first and second touch sensors, as previously discussed. When an additional touch input is applied while the first and second touch inputs are maintained, an enlarged or zoomed-in view 302 may be displayed of the selected region. If the screen information 300 corresponds to a map, the enlarged view may include detailed information of a location included in the map. The additional touch input may correspond to a pinch-out touch input in which the touch inputs are moved apart.

Referring to FIGS. 11A(b) and 11A(c), when the additional touch input is released while the first and second touch inputs are maintained, the enlarged screen 302 may be displayed as the screen information 300. Although not shown, when the additional touch input corresponds to a pinch-in touch input, the screen information may be zoomed-out or reduced based on the selected region. Further, when the additional touch input is released, the screen information 300 may be displayed again or the zoomed-out view may be displayed to replace the screen information 300.

Figure 11B:
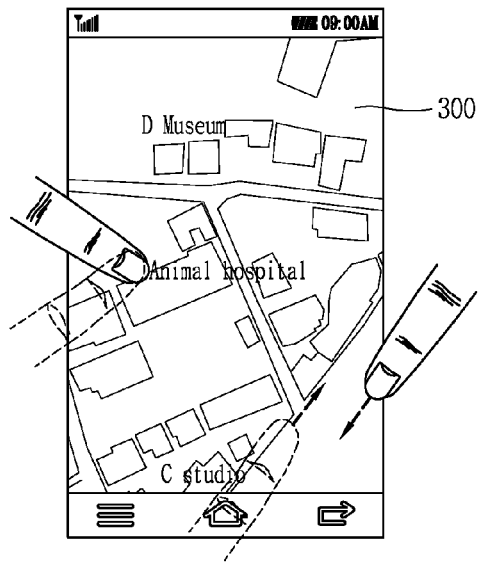
Figure 11B:
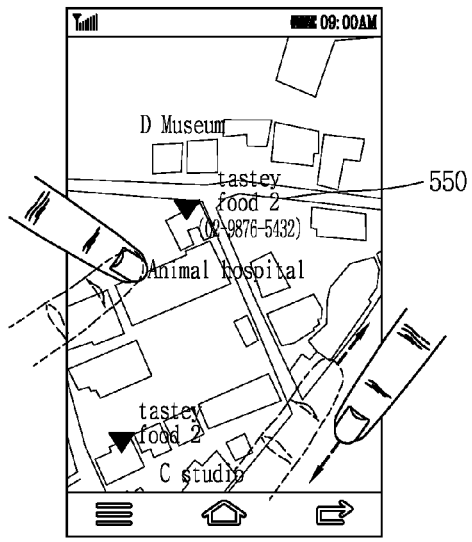
Figure 11B:
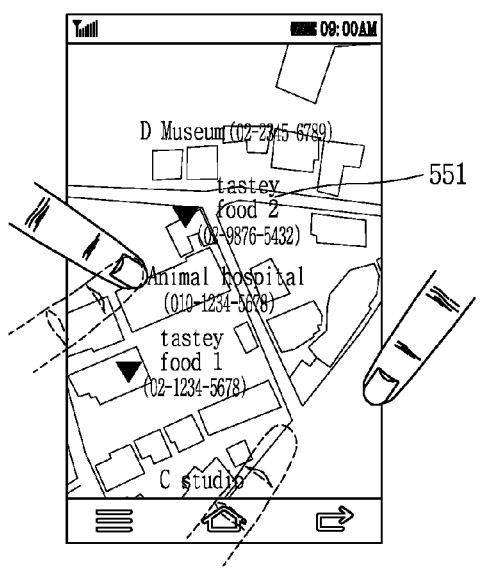

In another embodiment, referring to FIGS. 11B(a) to 11B(c), when an additional touch input is applied while the first and second touch inputs are maintained, additional information 550 may be displayed with the screen information 300. For instance, the additional information 550 may include details related to a location included in the screen information. The displayed details may include a name or details of the location, a building, a road, a shop, a phone number, an address, or any other information related to the displayed location.

The two-surface touch input may include consecutive touch inputs applied in different directions. Referring to FIGS. 11B(b) and 11B(c), when a two-surface touch input is applied while the additional information 550 is displayed, secondary information 551 may be further additionally displayed. For instance, the secondary information 551 may include further related information to the location or to the additional information 550, such as a phone number of a building where the building name was displayed in the additional information 550, details of a store such as business hours, customer ratings, and the like, or metadata or social media tag information. The additional information 550 and the secondary information 551 may be displayed together with the screen information 300, and may be continuously output while the first and second touch inputs are maintained. Thus, a user may be provided with additional details and related information of locations displayed on the screen information.

Figure 12A:
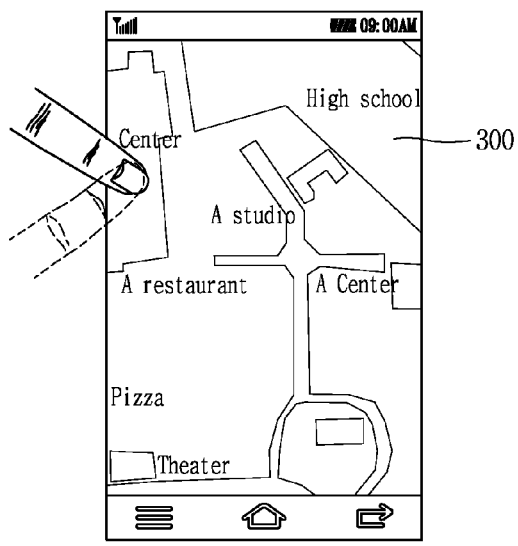
FIGS. 12A(a), 12A(b), 12A(c), 12B(a), 12B(b), 12C(a), 12C(b), 12D(a), and 12D(b) are conceptual views illustrating a control method of a mobile terminal for outputting screen information based on a two-surface touch input, according to another embodiment.
Figure 12A:
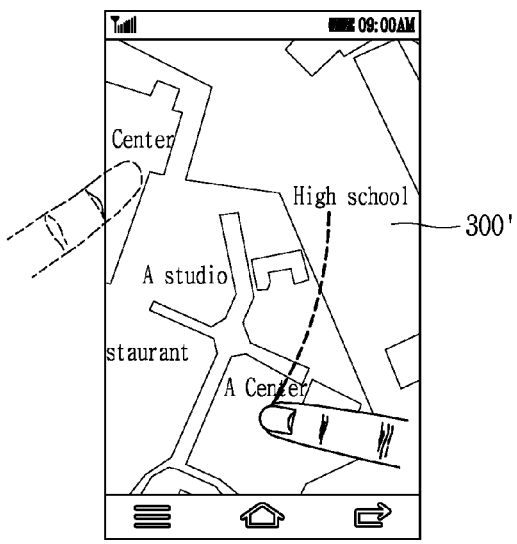
Figure 12A:
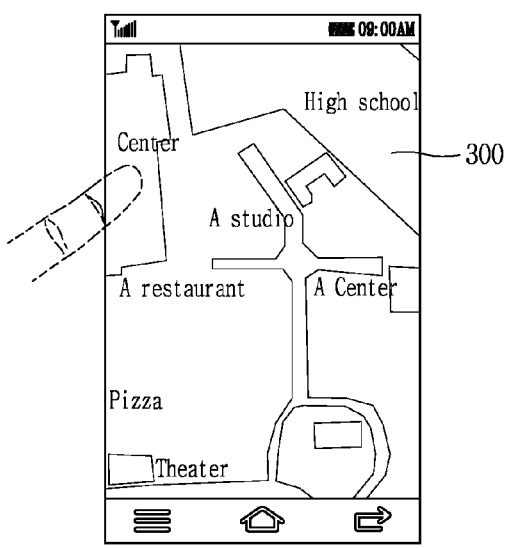

FIGS. 12A(a) to 12D(b) are conceptual views illustrating embodiments of a method of displaying screen information based on a touch input. Referring to FIGS. 12A(a) to 12A(c), when first and second touch inputs are applied to the screen information 300 the controller 180 selects a region on the screen information 300 based on the first and second touch inputs, as previously discussed.

Additional screen information 300' may be displayed based on an additional touch input when a maintained touch input is applied. The maintained touch input may be a continuation of the first touch input or the second touch input being maintained after the other input is released, however, in other embodiments, the maintained touch input may include another input applied after either or both the first and second touch inputs have been released, and other configurations of the maintained touch inputs are also considered. For convenience, it is assumed that the maintained touch input is a continuation of the first touch input in the following embodiments.

While the maintained touch input is maintained, an additional touch input may be applied which includes a dragging touch input. The additional screen information 300' may be displayed consecutive to the screen information 300 based on a direction of the additional touch input. If the screen information 300 corresponds to a map including a particular location, the map may be moved to be centered around another location or rotated about the particular location based on the third touch input.

Referring to FIGS. 12A(b) and 12A(c), when the additional touch input is released, the screen information 300 may once again be displayed. Thus, a user may be provided with screen information on a desired region by applying the additional touch input, then return to the initial screen information.

Figure 12B:
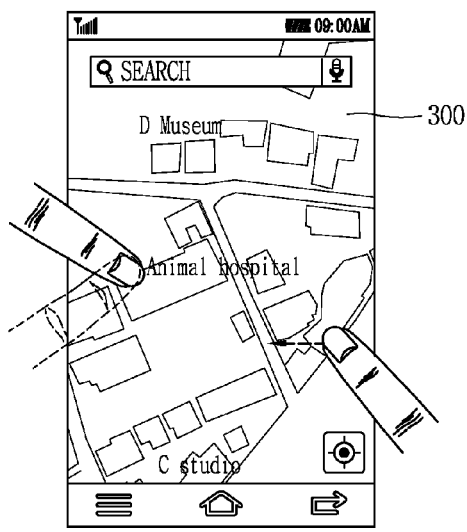
Figure 12B:
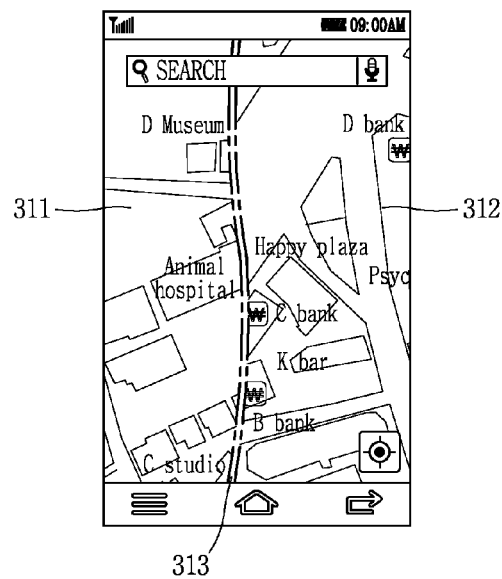

Referring to the embodiments of FIGS. 12B(a) and 12B(b), if an additional touch input is applied after a region is selected additional screen information may be displayed that is consecutive to the screen information. Referring to FIG. 12B(b), a first screen region 311 may be displayed including the selected region and a second screen region 312 including the additional screen information may be displayed based on the additional touch input. The first and second screen regions 311, 312 may be distinctively displayed and in some embodiments a divider 313 may be displayed to clearly define the distinction. The additional screen information may be determined by a user, a direction of the additional touch input, a location of the additional touch input, and the like, such that a second screen including another region desired to be viewed by the user can be displayed in a split screen or multi-screen view.

The divider 313 and its position may be determined based on an output position of the selected region on the display unit or a direction of the additional touch input. Thus, a user may be simultaneously provided with an additional region as well as the selected region in a split screen or simultaneous view screen.

Figure 12C:
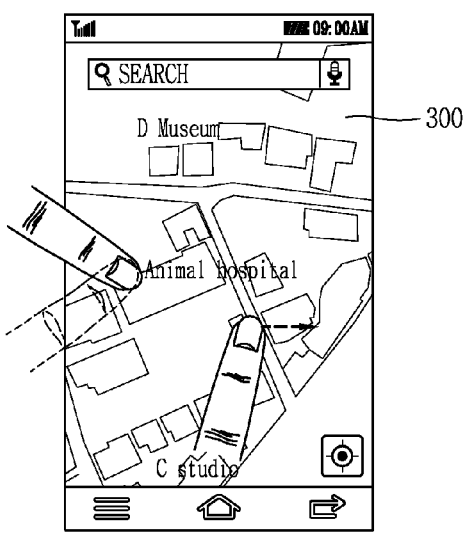
Figure 12C:
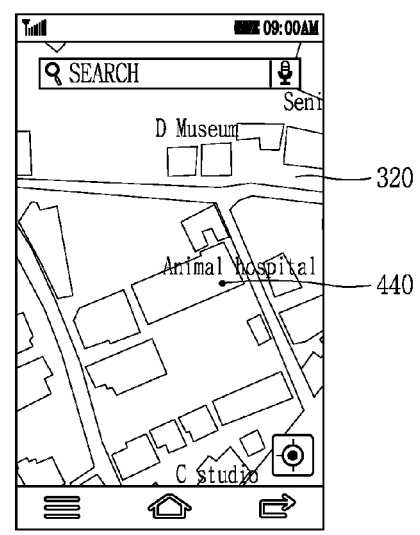

Referring to the embodiments of FIGS. 12C(a) and 12C(b), an indicator 440 indicating a selected region may be displayed based on an additional touch input. After displaying the original screen information 300, additional screen information 320 may be displayed based on a third touch input applied after the selection of the region that includes the indicator 440 in a different output position. Thus, a user may compare the selected region with additional screen information based on the displayed indicator. Although not shown, the controller 180 may cause the indicator 440 to no longer be displayed or to be re-displayed, based on an additional touch input.

Figure 12D:
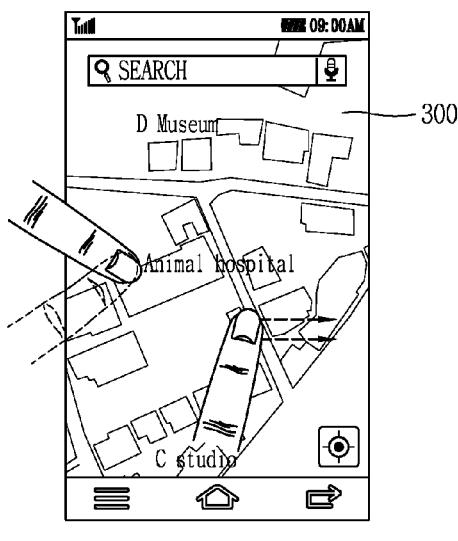
Figure 12D:
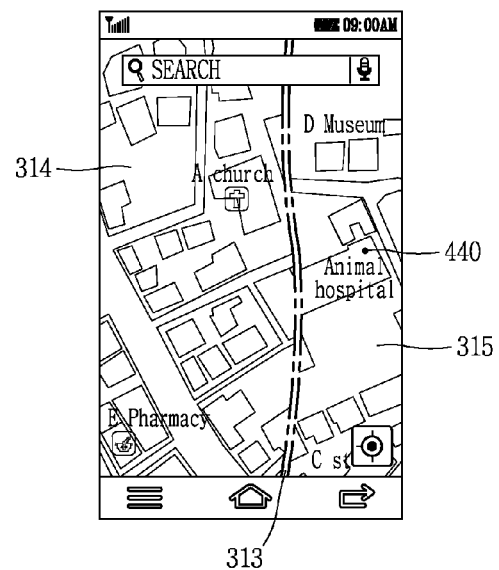

Referring to FIGS. 12D(a) and 12D(b), when a region on the screen information 300 is selected based on the first and second touch inputs, the indicator 440 may be displayed. If an additional touch input is applied while the indicator 440 is displayed, the position of the indicator 440 may be moved and the location displayed with the indicator may be moved to another position on the display. If the indicator 440 is output to a region adjacent to an edge of the display based on the additional touch input, the display may be partitioned into regions 314, 315. The region 315 includes part of the screen information 300 which included the indicator 440, and another region 314 may include additional screen information consecutive to the screen information 300 based on the additional touch input. The divider 313 may be displayed between the regions 314, 315. Thus, a user may be provided with additional screen information on the divided display by applying an additional touch input when necessary, while being continuously provided with an originally selected region.

Figure 13A:
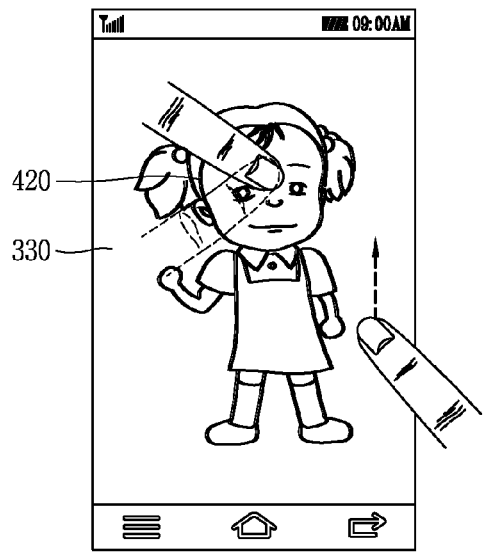
FIGS. 13A(a), 13A(b), 13B(a), and 13B(b) are conceptual views illustrating a control method of a mobile terminal for outputting a stereoscopic image based on a two-surface touch input, according to an embodiment of the present disclosure.
Figure 13A:
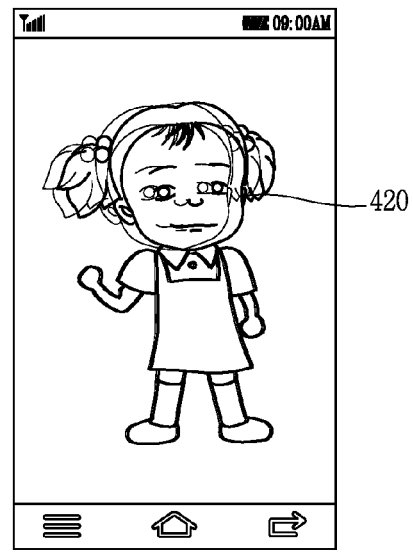

FIGS. 13A(a) and 13B(b) are conceptual views of illustrating embodiments of a method for controlling a stereoscopic image based on an additional touch input. Referring to FIGS. 13A(a) and 13A(b), the display unit may be configured to display a stereoscopic image 330 having a preset depth value. Although not shown, the controller 180 selects a region 420 based on first and second touch inputs applied to part of the stereoscopic image 330. After the region 420 is selected, the depth of the region 420 may be changed based on an additional touch input.

Figure 13B:
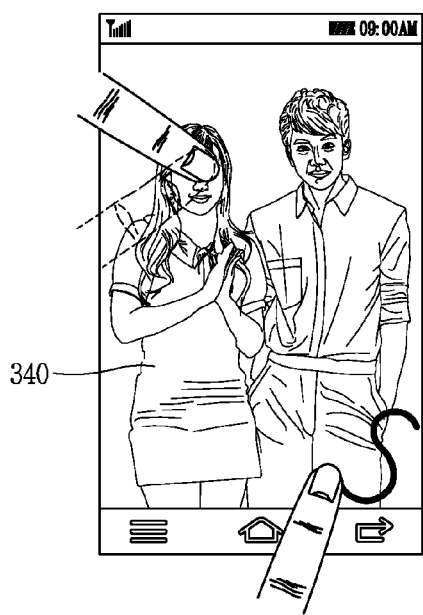
Figure 13B:
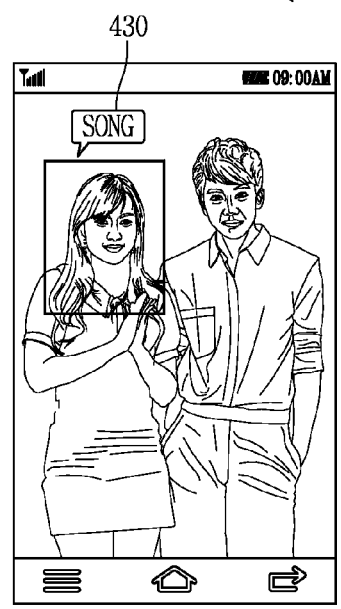

Referring to FIGS. 13B(a) and 13B(b), additional data may be entered by an additional touch input and stored to be associated with the displayed screen information. For example, while the screen information 340 is displayed, additional touch input may be received to enter information associated with the screen information or selected region, such as a letter "S" to signify that a person shown in an image has a name that starts with the letter S. The controller may further be configured to receive the additional touch input and determine additional data to associate with the screen information, such as by searching a local database with the additional touch input information, searching the internet or other networked database, and the like. The additional data 430 is then tagged to the selected region and stored in a memory to be associated with the screen information. The controller 180 controls the memory 170 to store the additional data 430 together with the region, and controls the display to output the additional data 430 to a position adjacent to the selected region.

Figure 14A:
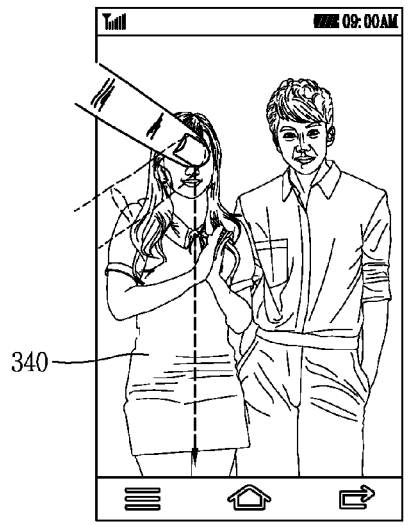
FIGS. 14A(a), 14A(b), 14B(a), and 14B(b) are conceptual views illustrating a control method of a mobile terminal for outputting screen information based on a two-surface touch input, according to an embodiment of the present disclosure.
Figure 14A:
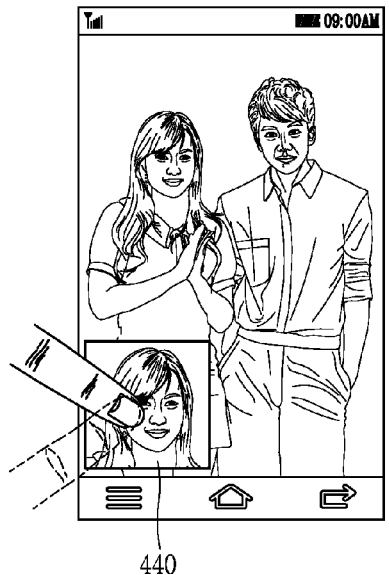

FIGS. 14A(a) to 14B(b) are conceptual views illustrating embodiments of a method of determining information based on an additional touch input. Referring to FIGS. 14A(a) and 14A(b), while the screen information 340 is displayed, a sub-image 440 including a selected region of the screen information may be displayed at a position where the first and second touch inputs are received, initiated, terminated, or the like. In one embodiment, when the first and second touch inputs are released, the sub-image 440 may no longer be displayed. However, in other embodiments, the sub-image may be continuously displayed, moved, or stored in a memory. The sub-image 440 may include an enlarged view of a selected region of the screen information 340.

Figure 14B:
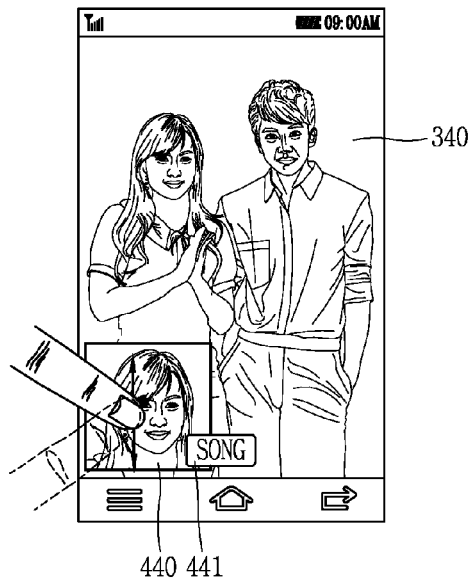
Figure 14B:
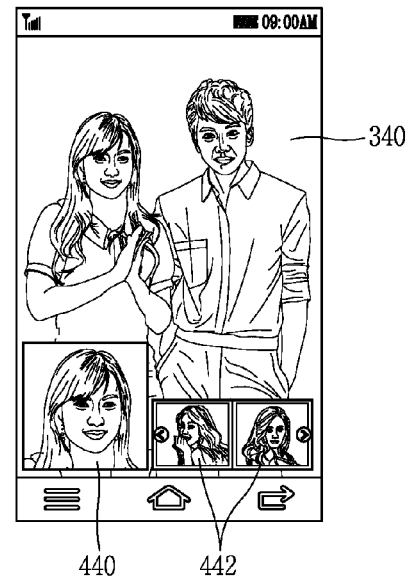

Referring to FIGS. 14B(a) and 14B(b), the controller 180 may be configured to determine metadata information, tagged information, or the like associated with the sub-image 440, or an object or person depicted in the sub-image based on an additional touch input applied to the sub-image 440. For example, the controller may search stored photos, a database, or networked data sources to identify an object or person in the sub-image, then display information associated with the object or person. The touch input may correspond to first and second touch inputs which move in different directions.

Further, the controller 180 may be further configured to identify related images 442 associated with the sub-image 440, such as images including the same person, same metadata or tags, or different views of the object displayed in the sub-image. Thus, a user may view an image by selecting part of the screen information be provided with information related to the image or selected region of the image, based on an additional touch input applied to the image.

Figure 15A:
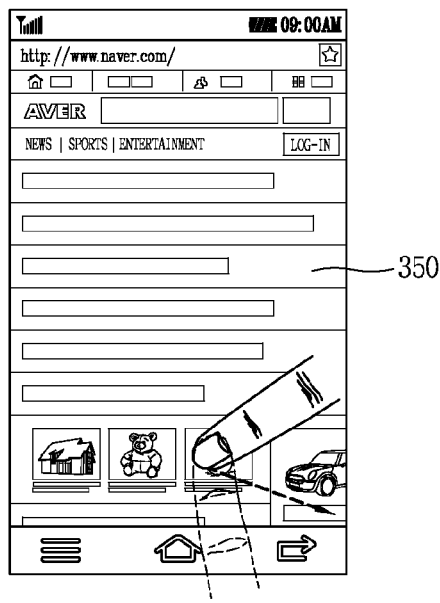
FIGS. 15A(a), 15A(b), 15A(c), 15B(a), and 15B(b) are conceptual views illustrating a control method of a mobile terminal for outputting screen information including link information based on a two-surface touch input, according to another embodiment of the present disclosure.
Figure 15A:
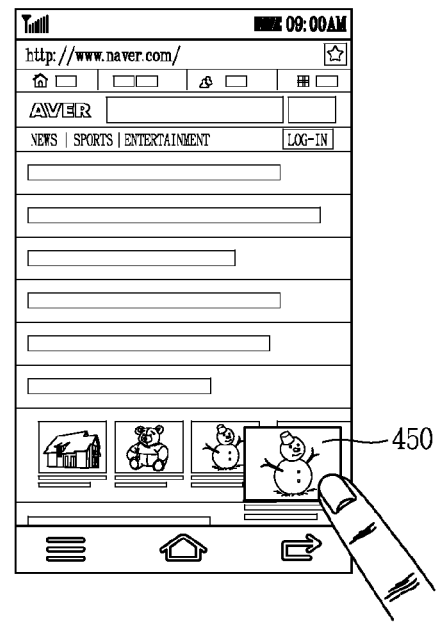
Figure 15A:
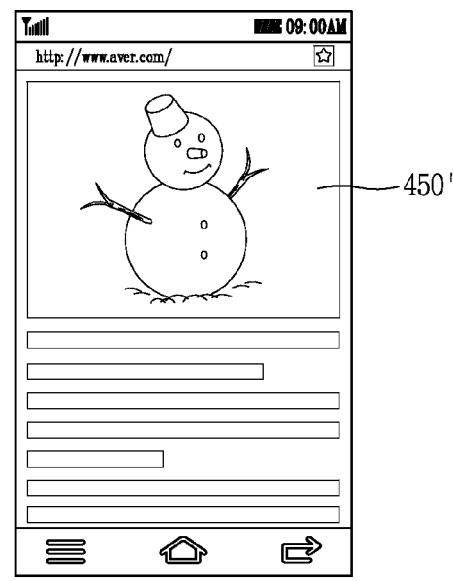

FIGS. 15A(a) to 15B(b) are conceptual views illustrating embodiments of a method of displaying screen information including link information based on a two-surface touch input. Referring to FIGS. 15A(a) to 15A(c), screen information 350 may be displayed which includes content including links to other pages or content, for instance, the screen information 350 may correspond to a webpage received from a server.

The controller 180 may select content based on first and second touch inputs similar to embodiments previously discussed, and an additional image 450 corresponding to the content may be displayed. The additional image 450 may correspond to an image included in the content, a link address of the content, and the like.

If an additional touch input is applied to the additional image 450 the screen information 350 may be changed into a content screen 450' related to the additional image. Although not shown, the screen information 350 may be changed into another screen linked to the content selected by the additional touch input. The controller 180 controls the display unit to continuously output the additional image 450 on the changed screen.

Figure 15B:
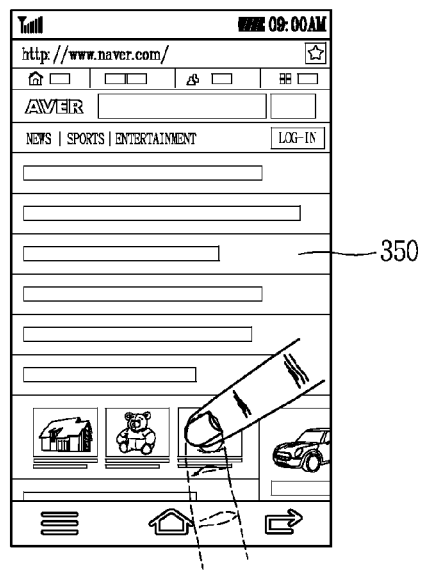
Figure 15B:
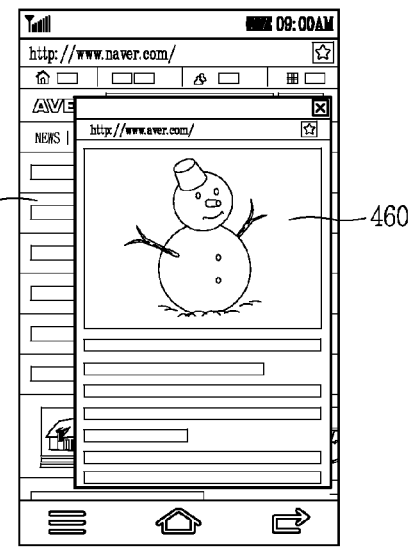

Referring to the embodiments of FIGS. 15B(a) and 15B(b), screen information 350 may be displayed. Referring to FIG. 15B(b), an additional image 460 related to the content may be displayed to be overlapped with the screen information 350 based on first and second touch inputs applied to a position corresponding to the content in an overlapped manner.

The additional image 460 may include a content screen of the selected content and is output to be overlapped with the screen information 350. Although not shown, based on a touch input applied to the additional image 460, the content screen may be changed based on an additional touch input independent from the screen information 350. However, when an additional touch input is applied to the screen information 350 the additional image 460 may no longer be displayed.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
   a terminal body comprising a first side and a second side;
   a display disposed on the first side and configured to display information;
   a first touch sensor configured to receive a first touch input and disposed on the first side;
   a second touch sensor configured to receive a second touch input and disposed on the second side; and
   a controller configured to:
   cause the display to display a first screen information corresponding to a map;
   select a region corresponding to a first location of the map based on the first and second touch inputs;
   designate each of a plurality of function regions of the displayed first information to a corresponding particular function to be executed;

execute a first function of a map guidance function when the first and second touch inputs are released at a first function region of the plurality of function regions, wherein the first function is associated with the first function region;
cause the display to display a secondary image of the first location with the first screen information when the first and second touch inputs are released at the first function region;
select a second location of the map based on additional first and second touch inputs to the first and second sides, respectively;
cause the display to display another secondary image of a plurality of secondary images, wherein the another secondary image corresponds to the second particular location when the additional first and second touch inputs are released at one of the plurality of function regions;
set each of the first and second particular locations as a destination, a starting point, or a waypoint for a route of the map guidance function; and
change the route of the map guidance function in response to one or more touch inputs rearranging the displayed plurality of secondary images, wherein the first and second particular locations are set as a destination, a starting point, or a waypoint based on an order of the rearranged displayed plurality of secondary images.

2. The mobile terminal of claim 1, wherein the controller is configured to cause the display to continue displaying the secondary image when the first touch input is released from a preset region of the display.

3. The mobile terminal of claim 1, wherein the selected region comprises an area of correspondence between a location of the first touch input on the first touch sensor and a location of the second touch input on the second touch sensor.

4. The mobile terminal of claim 1, wherein the secondary image comprises at least visual information, text information, or a graphic image associated with the selected region.

5. The mobile terminal of claim 1, wherein the controller is further configured to cause the display to cease displaying the secondary image when no touch inputs are received via the first touch sensor or the second touch sensor for a threshold length of time.

6. The mobile terminal of claim 1, wherein the controller is further configured to cause the display to continue displaying the secondary image while an additional touch input is received via the first touch sensor or the second touch sensor.

7. The mobile terminal of claim 6, wherein the additional touch input comprises the first touch input and the second touch input being moved in different directions.

8. The mobile terminal of claim 6, wherein the controller is further configured to cause the display to:
display second screen information in response to an additional control command; and
re-display the first screen information in response to an additional touch input received at the secondary image.

9. The mobile terminal of claim 1, wherein the controller is further configured to cause the display to change the secondary image in response to an additional touch input received via the first touch sensor.

10. The mobile terminal of claim 9, wherein the secondary image is changed to comprise an enlarged view of the secondary image.

11. The mobile terminal of claim 9, wherein the secondary image is changed to comprise text information related to the selected region.

12. The mobile terminal of claim 1, wherein the controller is further configured to cause the display to change the first screen information in response to an additional touch input received via the second touch sensor.

13. The mobile terminal of claim 12, wherein the controller is further configured to cause the display to:
display second screen information in response to an additional touch input received while the first and second touch inputs are maintained, and
redisplay the first screen information when the additional touch input is released.

14. The mobile terminal of claim 13, wherein the controller is further configured to cause the display to continue displaying the secondary image while the second screen information is displayed.

15. The mobile terminal of claim 14, wherein the controller is further configured to divide the display into a first region including the second screen information and a second region including the selected region.

16. The mobile terminal of claim 1, wherein the controller is further configured to cause the display to change a size of the secondary image in response to an additional touch input.

17. The mobile terminal of claim 1, wherein the controller is further configured to cause the display to:
change the first screen information when at least the first touch input or the second touch input is received at one of the plurality of function regions; and
re-display the first screen information when the first touch input and the second touch input are released.

18. The mobile terminal of claim 1, wherein the secondary image corresponds to a control window configured to receive a touch input for executing a function related to the selected region.

19. The mobile terminal of claim 1, wherein the controller is further configured to cause the display to display additional information related to the first screen information in response to an additional touch input received at least via the first touch sensor or the second touch sensor while the first touch input and the second touch input are maintained.

20. A method of controlling a mobile terminal comprising a display and a terminal body comprising a first side and a second side, the method comprising:
displaying a first screen information corresponding to a map on the display;
selecting a region corresponding to a first location of the map based on a first touch input received via a first touch sensor disposed on the first side and a second touch input received via a second touch sensor disposed on the second side;
designating each of a plurality of function regions of the displayed first information to a corresponding particular function to be executed;
executing a first function of a map guidance function when the first and second touch inputs are released at a first function region of the plurality of function regions, wherein the first function is associated with the first function region; and
displaying a secondary image of the first location with the first screen information when the first and second touch inputs are released at the first function region;
selecting a second location of the map based on additional first and second touch inputs to the first and second sides, respectively;

displaying another secondary image of a plurality of secondary images, wherein the another secondary image corresponds to the second particular location when the additional first and second touch inputs are released at one of the plurality of function regions;

setting each of the first and second particular locations as a destination, a starting point, or a waypoint for a route of the map guidance function; and changing the route of the map guidance function in response to one or more touch inputs rearranging the displayed plurality of secondary images, wherein the first and second particular locations are set as a destination, a starting point, or a waypoint based on an order of the rearranged displayed plurality of secondary images.

21. The method of claim 20, further comprising changing the secondary image in response to an additional touch input to the image received via the first touch sensor.

22. The method of claim 20, further comprising changing the first screen information when an additional touch input is received via the second touch sensor while the first and second touch inputs are maintained.

23. The method of claim 20, wherein the selected region comprises an area of correspondence between a location of the first touch input on the first touch sensor and a location of the second touch input on the second touch sensor.

* * * * *